United States Patent
Kimura et al.

(10) Patent No.: US 6,619,729 B2
(45) Date of Patent: Sep. 16, 2003

(54) SIDE BODY STRUCTURE OF VEHICLE

(75) Inventors: Takayuki Kimura, Hiroshima (JP);
Nobuyuki Shibutake, Hiroshima (JP);
Hidenori Matsuoka, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/160,270

(22) Filed: Jun. 4, 2002

(65) Prior Publication Data

US 2003/0006629 A1 Jan. 9, 2003

(30) Foreign Application Priority Data

Jun. 7, 2001 (JP) .................................. 2001-171982
Jun. 12, 2001 (JP) .................................. 2001-176969
Jun. 15, 2001 (JP) .................................. 2001-180958

(51) Int. Cl.[7] .................................................. B60J 7/00
(52) U.S. Cl. ............. 296/203.03; 296/188; 296/203.01
(58) Field of Search ........................ 296/203.03, 203.02, 296/203.04, 203.01, 146.6, 188, 189, 209, 202, 146.5, 146.9, 146.8, 204; 451/41

(56) References Cited

U.S. PATENT DOCUMENTS

| | | | |
|---|---|---|---|
| 4,930,836 A | | 6/1990 | Grinn |
| 5,046,778 A | * | 9/1991 | Larsen ........................ 296/188 |
| 5,242,209 A | * | 9/1993 | Yamauchi ............... 296/203.03 |
| 5,246,264 A | * | 9/1993 | Yoshii .................... 296/203.03 |
| 5,663,520 A | * | 9/1997 | Ladika et al. ................ 296/204 |
| 5,782,525 A | * | 7/1998 | Honma et al. .......... 296/203.04 |
| 5,860,694 A | * | 1/1999 | Seefried et al. ......... 296/203.03 |
| 5,938,275 A | * | 8/1999 | Kleinhans et al. ...... 296/203.03 |
| 5,941,597 A | * | 8/1999 | Horiuchi et al. ........ 296/203.01 |
| 6,042,176 A | * | 3/2000 | Ikeda et al. ............. 296/203.03 |
| 6,073,992 A | * | 6/2000 | Yamauchi et al. ...... 296/203.01 |
| 6,193,306 B1 | * | 2/2001 | Lee ........................ 296/203.03 |
| 6,206,758 B1 | * | 3/2001 | Lai et al. ...................... 451/41 |
| 6,209,949 B1 | * | 4/2001 | Sakyo et al. ........... 296/203.03 |
| 6,267,436 B1 | * | 7/2001 | Takahara ................ 296/203.02 |
| 6,322,135 B1 | * | 11/2001 | Okana et al. .......... 296/203.03 |
| 6,378,933 B1 | * | 4/2002 | Schoen et al. ......... 296/203.03 |
| 6,409,257 B1 | * | 6/2002 | Takashina et al. ..... 296/203.03 |
| 6,474,726 B1 | * | 11/2002 | Hanakawa et al. .... 296/203.03 |
| 6,478,367 B2 | * | 11/2002 | Ishikawa ............... 296/203.03 |
| 6,482,486 B1 | * | 11/2002 | Czaplicki et al. ....... 296/203.03 |
| 2002/0190544 A1 | * | 12/2002 | Yamamoto et al. .... 296/203.03 |

FOREIGN PATENT DOCUMENTS

| | | |
|---|---|---|
| EP | 0220414 | 5/1987 |
| JP | 2-20423 A | 1/1999 |

OTHER PUBLICATIONS

Patent Abstracts of Japan vol. 1998, No. 09, Jul. 31, 1998 & JP 10 109662 A (Mitsubishi Motors Corp.). Apr. 28, 1998 *Abstract*.

* cited by examiner

*Primary Examiner*—Kiran Patel
(74) *Attorney, Agent, or Firm*—Nixon Peabody LLP; Donald R. Studebaker

(57) ABSTRACT

The present invention provides a side body structure of a vehicle having a door-opening which is opened and closed by doors, wherein an annular door-opening member is provided along said door-opening, the annular door-opening member being formed in closed cross sectional shape by a side outer panel and a side inner panel jointed to inside of the side outer panel, and wherein said door-opening member is provided with an annular reinforcement which integrally and continuously extends in an annular manner along the door opening, thereby enhancing the body rigidity of the vehicle regardless of the size of the door-opening in a vehicle having a side body with a free-style type of doors.

30 Claims, 18 Drawing Sheets

SIDE BODY STRUCTURE OF VEHICLE

BACKGROUND OF THE INVENTION

1. Field of the Invention

The present invention relates to a side body structure of a vehicle in which a door-opening is provided for getting on and off the vehicle, and the door-opening is opened and closed by a front door and a rear door of a freestyle type door.

2. Description of the Prior Art

In conventional, as disclosed in U.S. Pat. No. 4,930,836 corresponding to Japanese Patent Laid-Open Publication No. Hei 2-20423, there has been disclosed a body structure of a vehicle in which a door-opening is provided in a side body, and the door-opening is opened and closed by a front door and a rear door which constitute a free-style type door.

In the prior art, a door opening with a center pillar less structure is formed in a side body of the vehicle. And, a front door is supported to open and close via front door hinges on a front line portion of the door-opening, while a rear door is supported to open and close via rear door hinges on a rear line portion of the door-opening.

The above-mentioned door-opening is opened and closed by means of the front door and the rear door by setting the side-sill to the lower line. In generally, the side-sill is formed as a closed cross sectional member extending in the vehicle longitudinal direction at side portions of a floor panel. However, in a vehicle having a-door opening with a center pillar less structure, at a time of a side collision of the vehicle, moving amount of the side body and the doors to inside of a crew's cabin become considerably larger than in a usual type of side body. This problem is remarkable, when the size of the door-opening is set to be larger in order to secure the convenience in getting on and off the vehicle.

In order to enhance the convenience in getting on and off the vehicle having such a body structure, it is preferable to determine the above-mentioned door opening to be larger. However, it is difficult to secure sufficient body rigidity and tortional rigidity of the vehicle body when the door opening is so large.

Further, in the above-mentioned body structure, a latch is provided at an upper part in forward of the rear door, and a keeper is mounted to a portion corresponding to the latch in the door opening. However, when rigidity of the mounting portion of the keeper is not sufficient, moving amount of the side body and the doors to inside of a crew's cabin at a time of a side collision of the vehicle become larger. This problem is also remarkable, when the size of the door opening is set to be larger in order to secure the convenience in getting on and off the vehicle, as explained above.

In generally, a fuel pipe extending from a fuel tank is arranged so that an end thereof is located to a side portion of the vehicle body between a lower line portion of a rear window-opening and a wheel house. The side portion of the vehicle body is set relatively slender due to design requirement, although it has to bear load input from a rear suspension. This lower the body strength, and there is a problem that positional deviation of a filler cap mounted on the end of the fuel pipe is apt to occur when the vehicle is subject to a collision.

Specifically, in a vehicle side body having a free-style type of doors as described above, the body strength of the side body in which the fuel pipe is arranged is further lowered when the above-mentioned type of door-opening is set larger in order to secure the convenience in getting on and off the vehicle,

SUMMARY OF THE INVENTION

An object of the present invention is to provide a side body structure of a vehicle which is capable of enhancing the body rigidity of the vehicle regardless of the size of the door-opening. It is preferable that the above-mentioned object is achieved in a vehicle having a side body with a free-style type of doors.

Another object of the present invention is to provide a side body structure of a vehicle which is capable of enhancing the rigidity of the locking portion for the door is enhanced regardless of the size of the door-opening. It is preferable that the above-mentioned object is achieved in a vehicle having a side body with a free-style type of doors.

Further, another object of the present invention is to provide a side body structure of a vehicle which is capable of receiving efficiently a collision load inputted into the side body at the time of a side collision of the vehicle, thereby restraining the moving amount of the side body and the doors into a crew's cabin at a time of a side collision of the vehicle. It is preferable that the above-mentioned object is achieved in a vehicle having a center pillar less type side body.

Furthermore, another object of the present invention is to provide a side body structure of a vehicle which is capable of restraining deformation of the side body portion near the fuel pipe by securing sufficient body rigidity. It is preferable that the above-mentioned object is achieved in a vehicle having a center pillar less type side body.

In accordance with a first aspect of the present invention, there is provided a side body structure of a vehicle having a door-opening which is opened and closed by doors, wherein an annular door-opening member is provided along said door-opening, the annular door-opening member being formed in closed cross sectional shape by a side outer panel and a side inner panel jointed to inside of the side outer panel, and wherein said door-opening member is provided with an annular reinforcement which integrally and continuously extends in an annular manner along the door opening.

The above-mentioned side outer panel may consist of a roof side rail outer, a front pillar outer, a hinge pillar outer, a side-sill outer, a rear pillar outer and the like. And the above-mentioned side inner panel may consist of a roof side rail inner, a front pillar inner, a hinge pillar inner, a side-sill inner, a rear pillar inner and the like. The above-mentioned annular reinforcement is preferably formed in one body, however it may be constructed by connecting separate parts in an annular manner.

According to the structure mentioned above, a closed cross sectional annular door-opening member is provided along a periphery of the door-opening, and the door-opening member is provided with an annular reinforcement which integrally and continuously extends in an annular manner along the periphery of the door-opening. By employing this construction, it is possible to enhance the body rigidity of the vehicle regardless of the size of the door-opening. Specifically, it is possible to restrain the movement of the side body and the doors toward the inside of the crew's cabin, in a center pillar less type of vehicle, when the vehicle is subject to a side collision. Further, since the tortional rigidity of the vehicle body is enhanced by the annular reinforcement, it is possible to enhance the operating stability of the vehicle.

In one embodiment of the present invention, the above-mentioned annular reinforcement is jointed between the side outer panel and the side inner panel, and is disposed in a closed cross sectional portion of the door-opening member.

In this case, since the annular reinforcement is disposed in a closed cross sectional portion of the door-opening member, the strength of the door-opening member is enhanced, thereby, it is possible to further enhance the body rigidity and the tortional rigidity of the vehicle body.

In one embodiment of the present invention, a rear pillar reinforcement extends rearward along a lower line portion of an rear window opening provided in a rear portion of the vehicle is provided in a rear line portion of the door-opening member.

The lower line portion of the rear window opening is set relatively slender due to design requirement of the vehicle, although it has to bear load input from a rear suspension. However, by employing the construction mentioned above, it is possible to sufficiently reinforce the lower line portion of the rear window opening by the rear pillar reinforcement and enhance the strength thereof.

In one embodiment of the present invention, a rear end of the rear pillar reinforcement is connected to a rear package member arranged in the vehicle widthwise direction in a lower line portion of the rear window opening.

In this case, the rear end of the rear pillar reinforcement is connected to a rear package member. Therefore, it is possible to continuously reinforce the lower line portion of the rear window opening by means of the rear package member extending in the vehicle widthwise direction and right and left rear pillar reinforcements. As a result, it is possible to enhance the strength of the whole vehicle body, and the strength of a corner in the front lower portion of the rear window in which stress is concentrated.

In accordance with a second aspect of the present invention based on the first aspect of the same, there is provided a side body structure of a vehicle having a door-opening which is opened and closed by doors, wherein a lock member for locking the door is provided in an upper line portion of the door-opening; and wherein a reinforcing member is provided between the door-opening in which the lock member is mounted and a roof panel provided in vicinity of said door-opening so as to connect to each other.

The above-mentioned lock member may be constituted as a striker.

According to the structure mentioned above, the door-opening provided with the lock member is connected to the roof panel by means of the reinforcement, it is possible to enhance the rigidity of a locking portion for the door regardless the size of the door-opening. Thereby, it is possible to restrain the moving amount of the side body and the doors into a crew's cabin at a time of a side collision of the vehicle in a center pillar less type of vehicle.

In one embodiment of the present invention, the roof panel is provided with a roof reinforcement extending in the vehicle widthwise direction, and a reinforcing stay is provided as the reinforcing member, an end portion of the reinforcing stay is connected to the roof reinforcement.

The roof reinforcement is capable of forming a dose cross section in associated with the roof panel.

In this case, since the door-opening provided with the lock member is connected to the roof reinforcement by means of the reinforcing stay, it is possible to further enhance the rigidity of a locking portion for the door.

In one embodiment of the present invention, a node-type reinforcement is disposed in the closed cross sectional portion of the door-opening member so as to correspond to a mounting portion of the lock member.

In this case, it is possible to remarkably enhance the rigidity of a locking portion for the door by both of a closed cross sectional structure of the door-opening member and the node-type reinforcement. Thereby, it is possible to restrain more effectively the moving amount of the side body and the doors into a crew's cabin at a time of a side collision of the vehicle in a center pillar less type of vehicle.

In one embodiment of the present invention, a front vertical line portion of the rear door is provided with a reinforcing member extending in a vertical direction, and a lock unit provided in the reinforcing member is engaged with the lock member.

In this case, it goes without saying that it is possible to enhance the rigidity of the rear door itself by arranging the reinforcing member in the rear door. Also, it is possible to enhance the rigidity in mounting the lock unit and the rigidity in locking the door to the vehicle body in a closed condition of the rear door. Thereby, it is possible to enhance the tortional rigidity of the vehicle body, and to enhance the operating stability of the vehicle.

In accordance with a third aspect of the present invention based on the first aspect of the same, there is provided a side body structure of a vehicle having a door-opening which is opened and closed by doors, further comprises a side-sill formed in a closed cross sectional shape extending in the vehicle longitudinal direction at a side of an floor panel, a floor cross member provided in the floor panel and extends in the vehicle widthwise direction, a node-type reinforcement provided within the side-sill, and a connection member for connecting between the floor cross member and the reinforcement.

The above-mentioned floor cross member may be constituted by so-called No. 2 cross member and No. 3 cross member.

According to the structure mentioned above, it is possible to efficiently receive a lateral collision load at a time of a side collision by means of the floor cross member and the floor panel via the node-type reinforcement within the side-sill and the connection member. As a result, it is possible to restrain the intrusion of the side body into the crew's cabin. Especially, it is possible to restrain the moving amount of the side body and the doors into a crew's cabin at a time of a side collision of the vehicle in a center pillar less type of vehicle.

In one embodiment of the present invention, the floor cross member and the reinforcement are disposed at positions which are a predetermined amount offset in the vehicle longitudinal direction.

In this case, the floor cross member and the node-type reinforcement disposed at positions deviated to each other in the vehicle longitudinal direction are connected mutually by the connection member. Therefore, even the both members (the floor cross member and the node-type reinforcement) are disposed at positions which are a predetermined amount offset, it is possible to efficiently receive the lateral collision load.

In one embodiment of the present invention, the floor panel is provided with a seat rail member, as the connection member, for supporting a seat arranged above the floor panel.

In this case, the seat rail member as an existing member and a strength member is corresponding to the connection member. Therefore, it is possible to receive the lateral collision load, without increasing the body weight, by using effectively the seat rail member as an existing member.

In one embodiment of the present invention, the doors are opened and closed by setting the side-sill to the lower line, and a lock member for locking the door is provided on the side-sill in a vicinity of the reinforcement.

The above-mentioned lock member may be constituted as a striker.

In this case, since there is the node-type reinforcement in a vicinity of the lock member, it is possible to reinforce the lock member by the node-type reinforcement.

In one embodiment of the present invention, a lower line portion of the annular reinforcement is disposed between a side-sill inner and a side-sill outer forming the side-sill, and the node-type reinforcement is jointed to the annular reinforcement.

In this case, the door-opening is reinforced by the annual reinforcement extending along the door-opening. Thereby, it is possible to enhance the body rigidity and the tortional rigidity of the vehicle body, and to enhance the operating stability of the vehicle. Furthermore, the lower line portion of the annular reinforcement is disposed in a closed cross sectional portion of the side-sill, and the node-type reinforcement is jointed to the annular reinforcement. Therefore, it is possible to further enhance the strength of the side-sill.

In accordance with a fourth aspect of the present invention based on the first aspect of the same, there is provided a side body structure of a vehicle having a door-opening which is opened and closed by doors, wherein a fuel pipe extending from a fuel tank is arranged so that an end of said fuel pipe faces a side portion of the vehicle body which is close to said door-opening; and wherein a rear pillar reinforcement is provided so that one end thereof is jointed to said annular reinforcement and an other end is extended to proximity of the fuel pipe.

According to the structure mentioned above, it is possible to support the fuel pipe by the rear pillar reinforcement, and enhance the rigidity of the vehicle body by the annular reinforcement extending along the door-opening. In this case, even the fuel pipe is mounted in the side body, the rigidity of the side body is not so lowered. As a result, it is possible to restrain the deformation of the side body portion near the fuel pipe. Especially, it is possible to secure sufficient body rigidity in a center pillar less type of vehicle.

In one embodiment of the present invention, the rear pillar reinforcement is provided with a through hole into which the fuel pipe goes through.

In this case, it is possible to support the fuel pipe by means of the through hole. Further, it is possible to set the fuel pipe to an optional position under enhancing the body rigidity by the rear pillar reinforcement.

In one embodiment of the present invention, the rear pillar reinforcement is provided with an extension portion extending along a lower line portion of a rear window provided in a rear body of the vehicle.

The lower line portion of the rear window opening is set relatively slender due to design requirement of the vehicle, although it has to bear load input from a rear suspension. However, by employing the construction mentioned above, it is possible to sufficiently reinforce the lower line portion of the rear window opening by the rear pillar reinforcement and the extension portion thereof, and enhance the strength of the lower line portion of the rear window opening.

In one embodiment of the present invention, the extension portion of the rear pillar reinforcement is connected to a rear package member disposed in the vehicle widthwise direction in the lower line portion of a rear window opening.

In this case, the extension portion of the rear pillar reinforcement is connected to the rear package member. Therefore, it is possible to continuously reinforce the lower line portion of the rear window opening by means of the rear package member extending in the vehicle widthwise direction and right and left rear pillar reinforcements. As a result, it is possible to enhance the strength of the whole vehicle body, and the strength of a corner in the front lower portion of the rear window in which stress is concentrated.

In the first to the force aspect of the present invention, the door-opening may be provided with a front door which is supported to be opened and closed by means of hinges in a front line portion of the door-opening.

In this case, the aforesaid advantages are obtained in the side body having such a type of front door. Further, since the hinge mounting portion is reinforced by the annular reinforcement, it is possible to enhance the rigidity in supporting the front door.

In the first to four aspect of the present invention, the door-opening may be provided with a rear door which is supported to be opened and closed by means of hinges in a rear line portion of the door-opening.

In this case, the aforesaid advantages are obtained in the side body having such a type of rear door. Further, since the hinge mounting portion is reinforced by the annular reinforcement, it is possible to enhance the rigidity in supporting the rear door.

In one embodiment of the present invention, a rear end of the front door is to be locked at a front end of the rear door. And, the front end of the rear door is to be locked in at least one of an upper line portion and a lower line portion of the door-opening.

In this case, since the doors are locked at portions of high rigidity which is reinforced by the annular reinforcement, it is possible to enhance the rigidity in supporting the doors in closed condition.

DESCRIPTION OF THE PREFERRED EMBODIMENT

A description will be in detail given below of an embodiment in accordance with the present invention with reference to the accompanying drawings.

Figure 1:
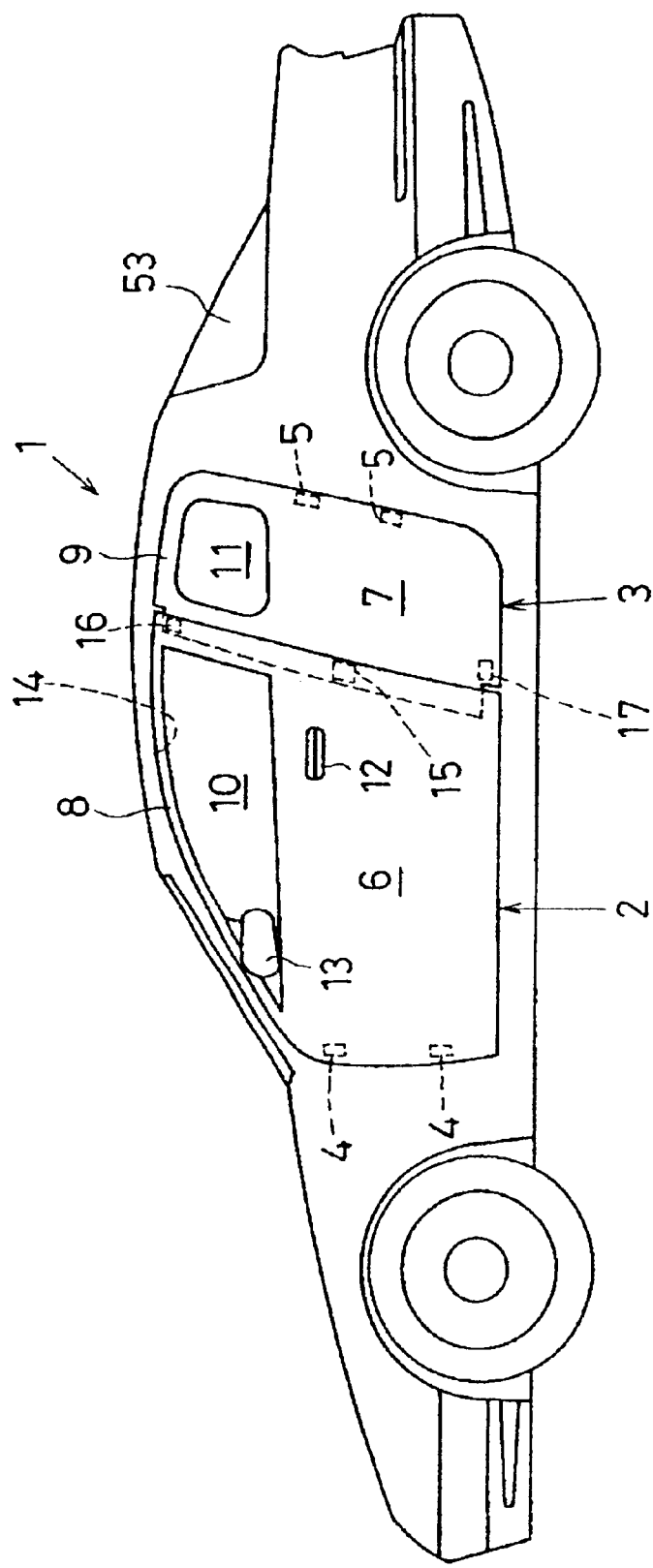
FIG. 1 is a side elevational view of a vehicle provided with a side body structure in accordance with the present invention.

The drawings show a front body structure of a vehicle. As shown in FIG. 1, a side door constituted by a front door 2 and a rear door 3 is provided in a side body of a vehicle 1. And, a front door hinge 4 and a rear door hinge 5 corresponding to hinge portions are respectively provided in a front end of the front door 2 and a rear end of the rear door 3, whereby the side door having a free-style type structure is constituted.

The front door 2 and the rear door 3 constituting the side door are respectively provided with a door panel 6 and 7, a door sash 8 and 9, and a window glass 10 and 11. Further, they are respectively provided with a side impact bar (not shown) extending in a longitudinal direction of the vehicle, in inner space of the above-mentioned door panel 6 and 7, in detail between door outer panel and door inner panel.

Furthermore, the front door 2 is provided with a door outer handle 12 for executing opening and closing operations of the front door 2 from external side of the vehicle, and a door mirror 13 for viewing a backward area of the vehicle.

The door having the free-style type structure in accordance with the present embodiment is constituted such that the front door 2 is preferentially opened and the rear door 3 is allowed to be opened after the front door 2 is opened.

The above-mentioned doors 2 and 3 cover a door opening 14 (refer to FIG. 5) so as to open and close it. As shown in FIG. 1, a lock member 15 is provided at a rear end of the front door 2. The lock member 15 is to be locked by a striker provided at a front end of the rear door 3. Lock members 16 and 17 are provided at upper and lower portions of the front end of the rear door 3. And the respective lock members 16 and 17 are constituted such as to be locked by strikers 44 and 69 (refer to FIGS. 6, 8 and 11) of the vehicle body mentioned below provided in an upper line portion and a lower line portion of the door opening 14.

Figure 2:
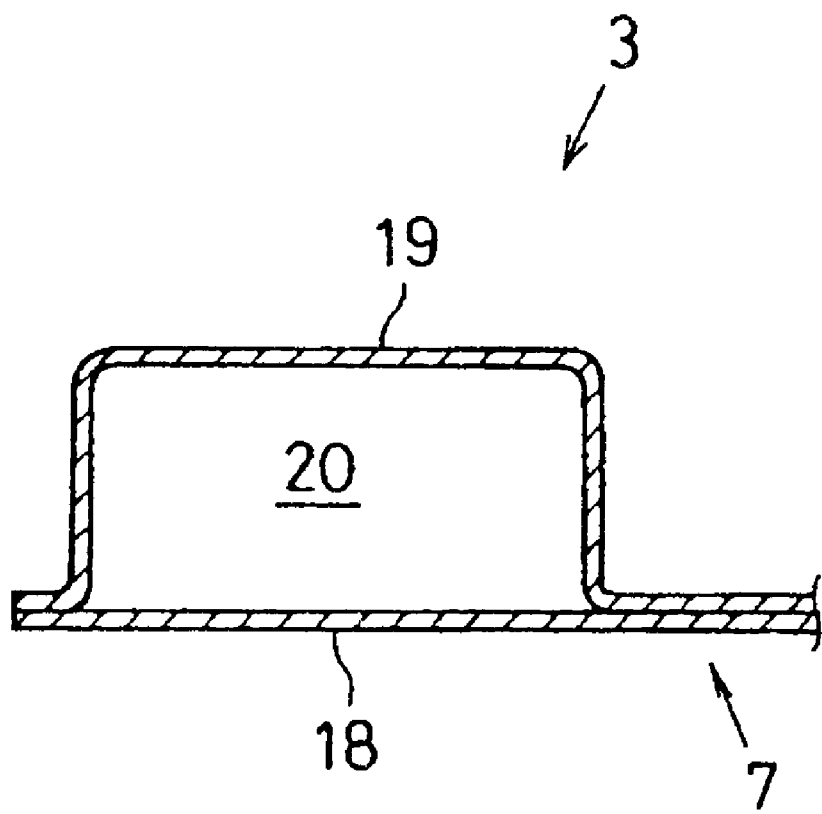
FIG. 2 is a cross sectional view of a front end portion of a rear door.

With respect to the rear door 3, a cross sectional portion of a front end thereof is shown in FIG. 2, a door inner reinforcement 19 as a door reinforcing member extending in a vertical direction is jointed to a front vertical line portion of a door outer panel 18. And, a closed cross sectional portion 20 extending in the vertical direction is formed by the both elements 18 and 19, thereby a so-called virtual center pillar is constituted.

Further, the above-mentioned striker at the front end of the rear door 3 and the upper lock member 16 (lock unit) are provided in this closed cross sectional portion. Furthermore, the lower lock member 17 (lock unit) is provided in the door inner reinforcement 19 or near the same.

Figure 3:
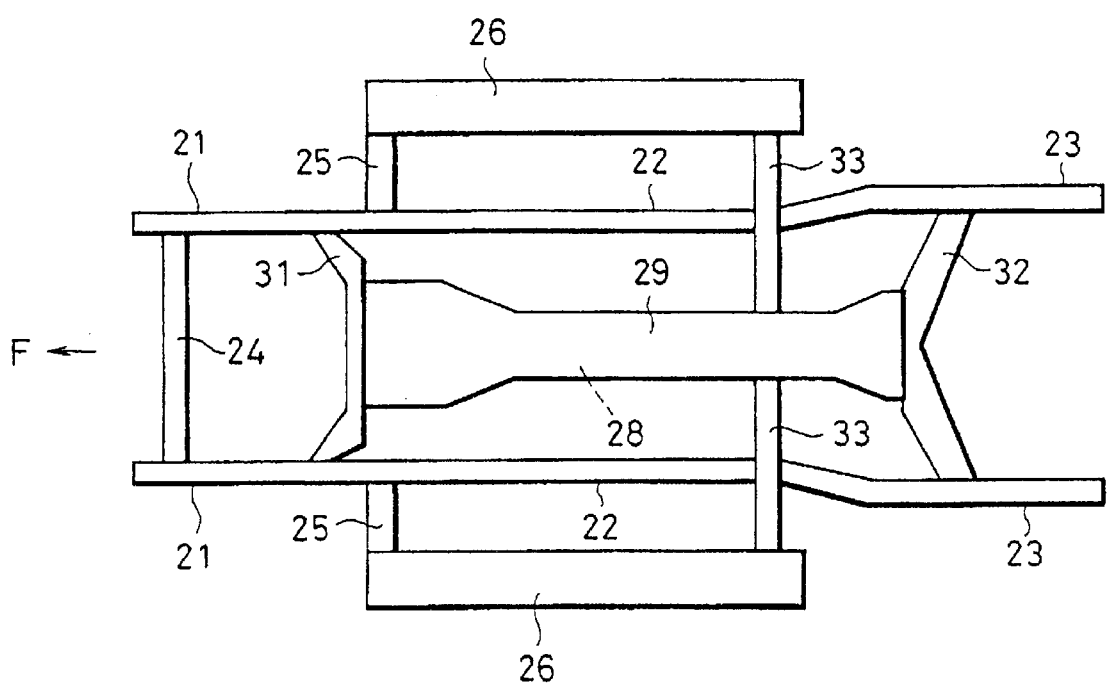
FIG. 3 is a plan view showing a frame structure.

As shown in FIG. 3, a front cross member (so-called No. 1 cross member) 24 extending in the vehicle widthwise direction is disposed between front portions of the above-mentioned front side-frames 21 and 21. Further, a torque box 25 extending in the vehicle widthwise direction is provided in an outer side of the rear end of the front side-frame 21 to correspond to a lower part of the dash panel (refer to a dash lower panel 75 shown in FIG. 13). And a side-sill 26 extending in the vehicle longitudinal direction and substantially in parallel to the floor frame 22 is mounted to an outer end portion of the torque box 25.

Figure 4:
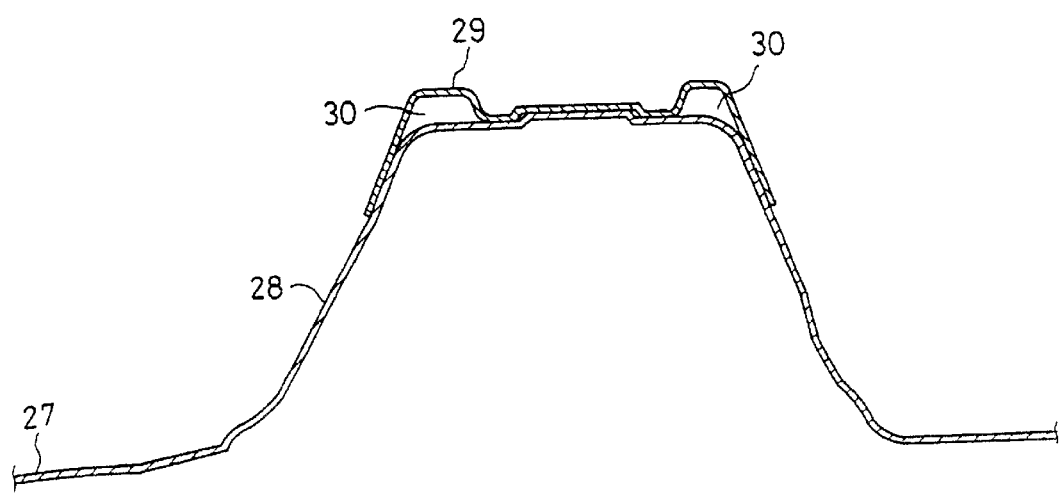
FIG. 4 is a cross sectional view of a tunnel portion.

As shown in FIG. 4, the tunnel portion 28 protruding upward and extending in the vehicle longitudinal direction is formed in a substantially center portion of the floor panel 27. Further, a tunnel member 29 (so-called high mount backbone frame) is mounted to an upper surface of the tunnel portion 28 all along the length of the tunnel portion 28. And, closed cross sectional portions 30 and 30 extending in the vehicle longitudinal direction are formed between the tunnel portion 28 and the tunnel members 29. Thereby, an improvement of the vehicle body rigidity is intended. It is to be noted that the above mentioned tunnel member 29 extends in the vehicle longitudinal direction along the tunnel portion 28.

In the embodiment, the tunnel member 29 has a concavity in cross section so as to form a pair of closed cross section in associated with the tunnel portion 28. It is to be noted that the tunnel member may have such a shape to form only one closed cross section in associated with the tunnel portion.

As shown in FIG. 3, a front end of the tunnel member 29 jointed and fixed to the upper surface of the tunnel portion 28 all along the length thereof is connected to the rear end portions of the front side-frames 21 and 21 via a front connection frame 31. And the rear end of the tunnel member 29 and the rear side-frames 23, 23 are connected by a rear connection frame 32.

Further, a rear portion of the side-sill 26 is connected to the tunnel portion 28 by a rear cross member 33 extending in the vehicle widthwise direction.

And, in the embodiment, a collision energy at a time of a head-on collision is transmitted from the front side-frame 21 to the floor frame 22, and is transmitted to the side-sill 26 via the torque box 25. Further, the collision energy is transmitted to the tunnel portion 28 and the tunnel member 29. Thereby, the collision energy mentioned above is dispersed into the floor frame 22, the side-sill 26, the tunnel portion 28 and the tunnel member 29. On the other hand, a collision energy at a time of a rear end collision is transmitted from the rear side-frame 23 to the floor frame 22, and is transmitted to the side-sill 26 via the rear cross member 33. Further, the collision energy is transmitted to the tunnel portion 28 and the tunnel member 29 via the rear connection frame 32. Thereby, the collision energy mentioned above is dispersed into the floor frame 22, the side-sill 26, the tunnel portion 28 and the tunnel member 29.

Next, a description will be given of a side body structure of the vehicle with reference to FIGS. 5 to 13.

Figure 5:
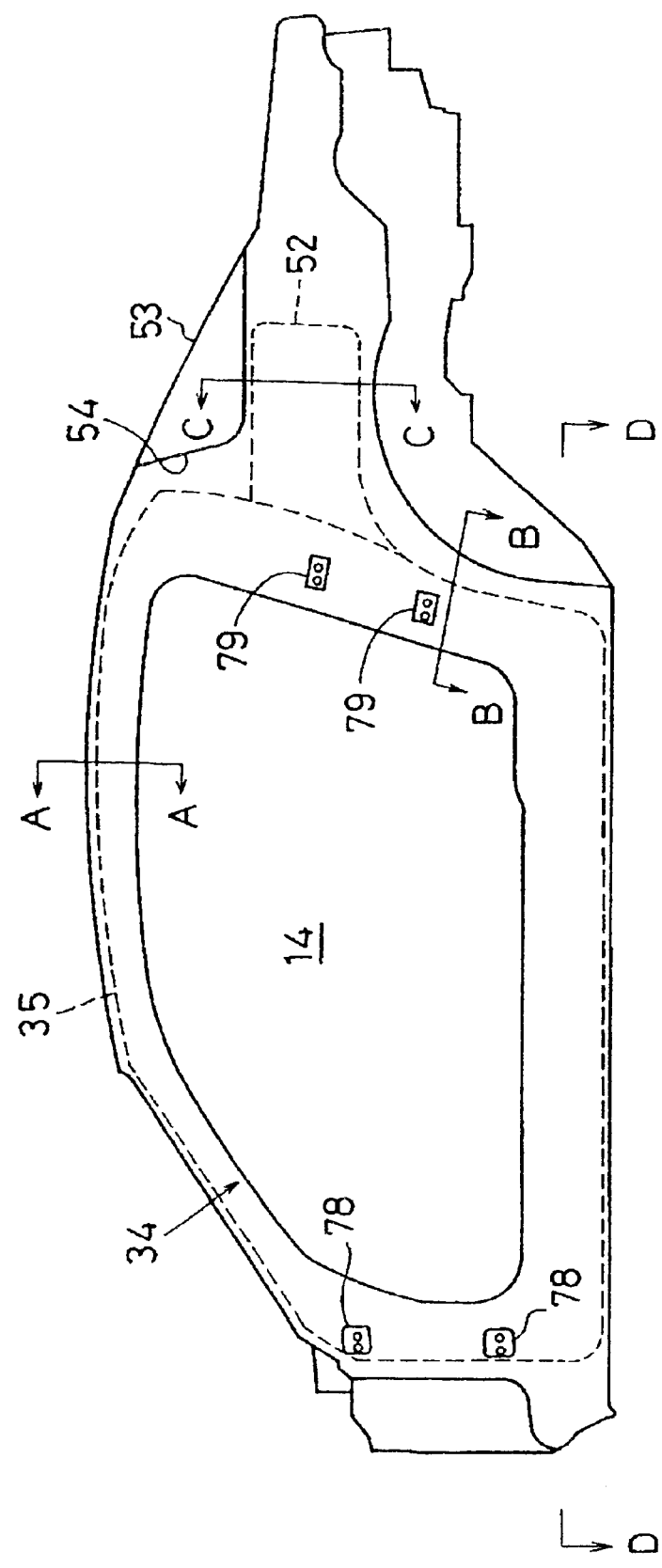
FIG. 5 is an enlarged side elevational view showing a cabin-side body.

FIG. 5 is a side elevational view of a cabin-side portion of the vehicle body. An annular door-opening member 34 is provided along the door opening 14 which is opened and closed by the front door 2 and the rear door 3 shown in FIG. 1.

The door-opening member 34 is constituted from a side outer panel and a side inner panel. The side outer panel comprises a roof side rail outer, a front pillar outer, a hinge pillar outer, a side-sill outer and a rear pillar outer. And the side inner panel comprises a roof side rail inner, a front pillar inner, a hinge pillar inner, a side-sill inner and a rear pillar inner.

An annular reinforcement 35 which integrally and continuously extends in an annular manner along the door opening 14 is provided within a closed cross sectional portion of the above mentioned door opening member 34. And a body rigidity and a torsional rigidity of the vehicle body is intended to be enhanced by means of the annular reinforcement 35.

Figure 6:
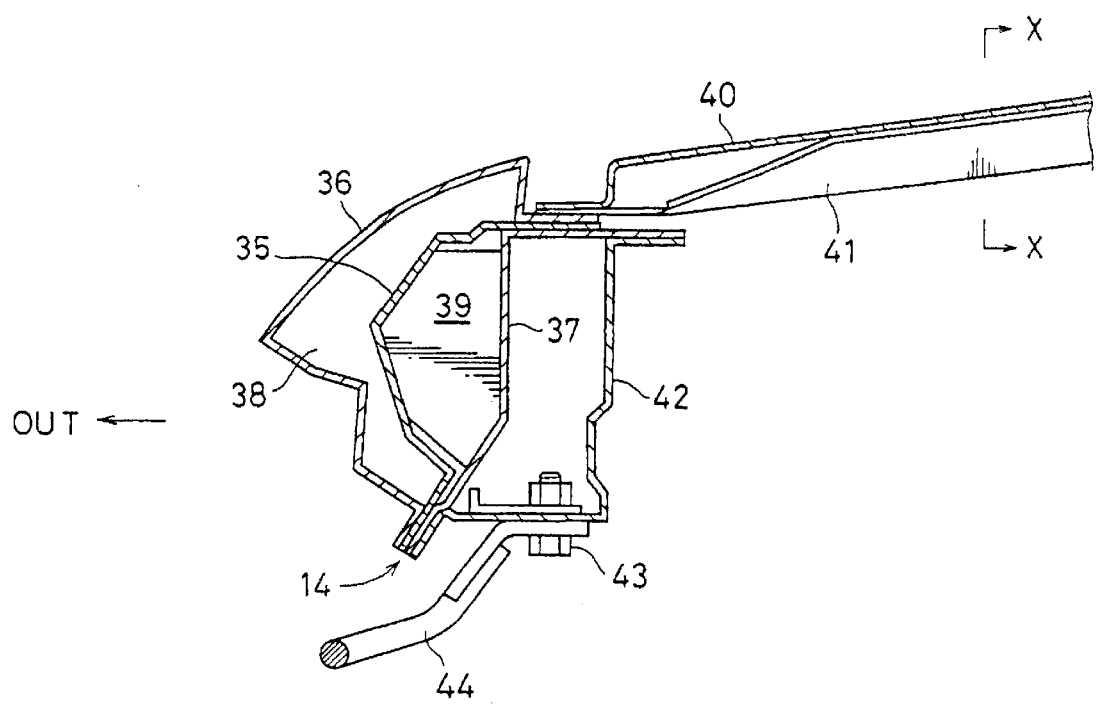
FIG. 6 is a cross sectional view as seen from a line A—A in FIG. 5.

FIG. 6 is a cross sectional view along a line A—A in FIG. 5. A closed cross sectional portion 38 extending in the longitudinal direction of the vehicle is formed by a roof side rail outer 36 and a roof side rail inner 37 jointed to an inner side of the roof side rail outer 36. And, the above mentioned annular reinforcement 35 is arranged so as to be jointed to the roof side rail outer 36 and the roof side rail inner 37 between them within the closed cross sectional portion 38.

Further, a node-type striker reinforcement 39 is disposed between the annular reinforcement 35 and the roof side rail inner 37. The striker reinforcement 39 is provided so as to correspond to a mounting portion of the striker 44 mentioned below.

Figure 7:
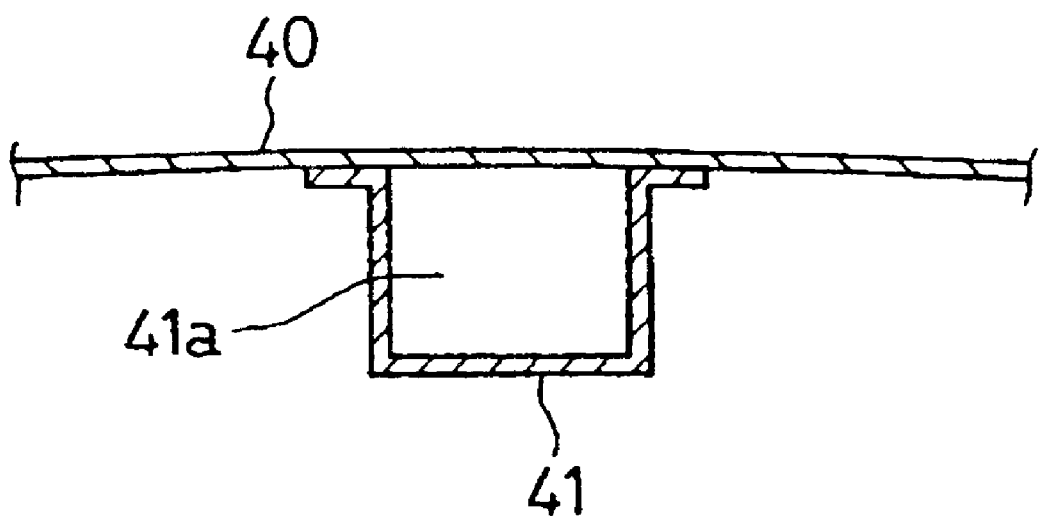
FIG. 7 is a cross sectional view as seen from a line X—X in FIG. 6.

A roof panel 40 is mounted to an upper jointing portion between the roof side rail outer 36 and the roof side rail inner 37. And a roof reinforcement 41 extending in the vehicle widthwise direction is jointed to a lower surface of the roof panel 40 as shown in FIG. 7. A closed cross sectional portion 41a extending in the vehicle widthwise direction is formed between those elements 40 and 41.

A reinforcing member 42 is disposed and fixed between an upper extension portion of the roof side rail inner 37 extending inward and a lower jointing portion of the roof side rail 36 and 37. A striker 44 is mounted to a lower surface of a horizontal portion of the reinforcing member 42 by using a mounting member 43 such as bolts, nuts or the like. The striker 44 is structured such as to engage a latch of the lock member 16 shown in FIG. 1. Further, the above-mentioned reinforcing member 42 corresponds to a reinforcing means for connecting between the door opening 14 and the roof panel 40.

Figure 8:
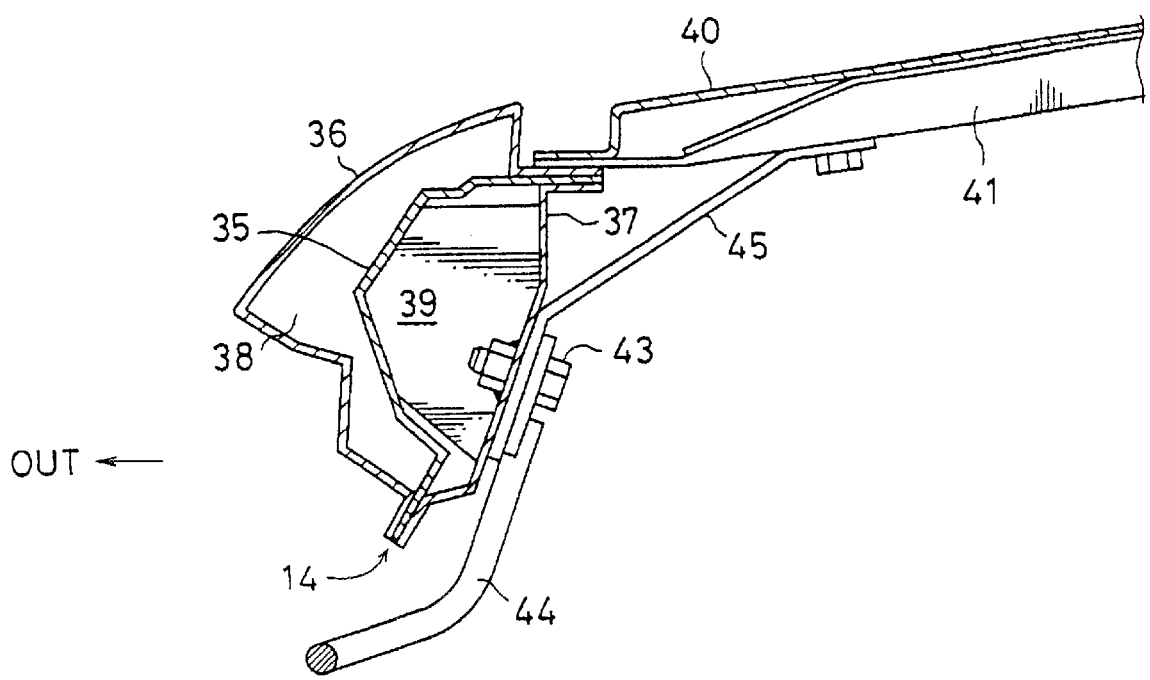
FIG. 8 is a cross sectional view showing another embodiment of a striker reinforcing structure.

It is to be noted that a structure shown in FIG. 8 may be employed in place of the structure shown in FIG. 6. That is, in the alternative structure a reinforcing stay 45 is provided as a reinforcing member for connecting between the roof reinforcement 41 and the roof side rail inner 37 in an obliquely crossing manner. The striker 44 may be mounted to such a portion that corresponds to the striker reinforcement 39 in the lower part of the reinforcing stay 45 by using the mounting member 43 such as bolts, nuts or the like.

Figure 9:
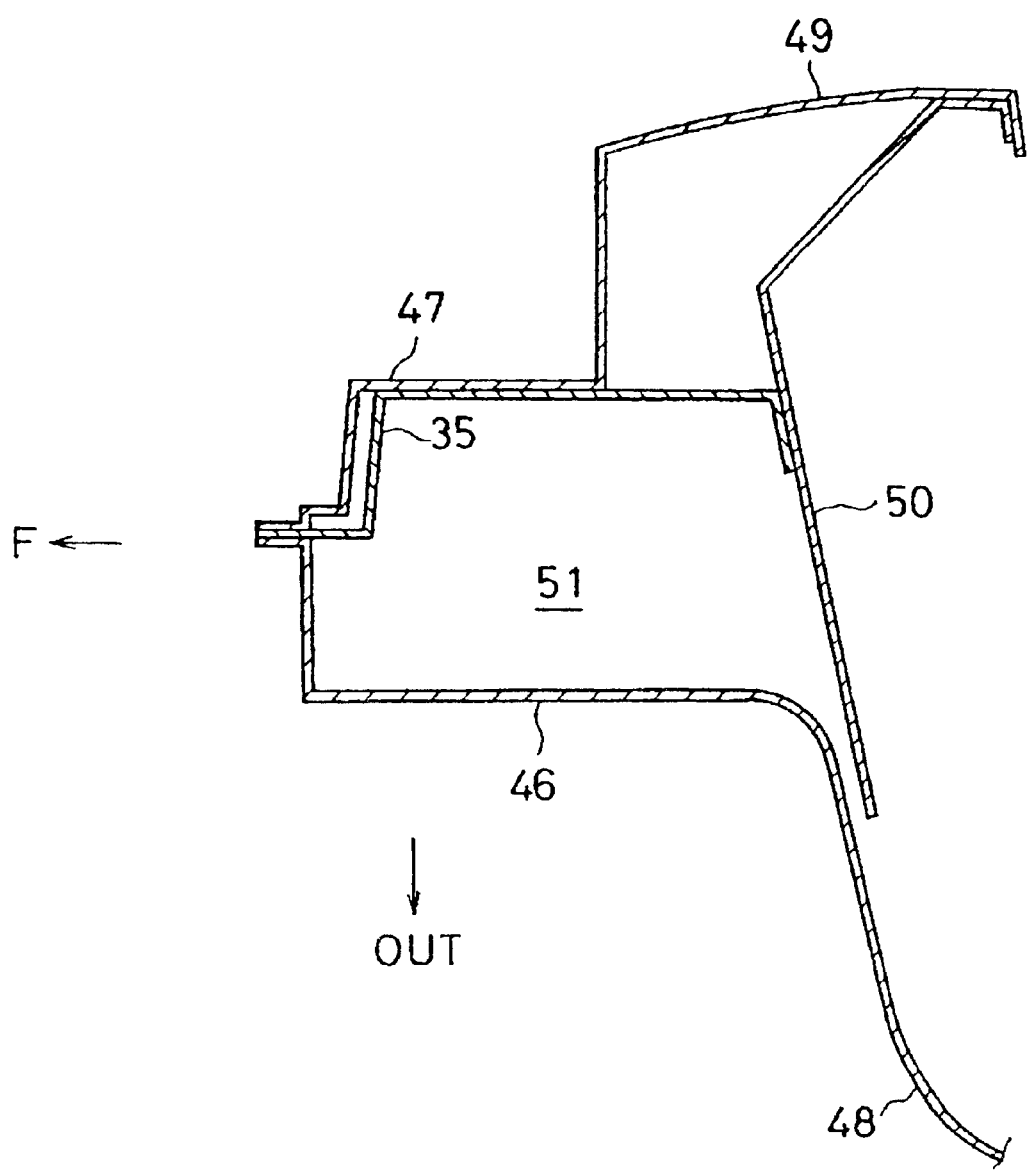
FIG. 9 is a cross sectional view as seen from a line B—B in FIG. 5.

FIG. 9 is a cross sectional view along a line B—B in FIG. 5. A rear pillar inner 47 is jointed to an inner side of the rear pillar outer 46. A rear fender 48 is continuously formed in a rear portion of the rear pillar outer 46, and a wheel-house inner lower 49 is continuously formed in a rear portion of the rear pillar inner 47.

Further, a wheel-house outer 50 is provided between the above-mentioned wheel house inner lower 49 and the rear fender 48, and there is formed a closed cross sectional portion 51 surrounded by the rear pillar outer 46, the rear pillar inner 47 and the wheel house outer 50.

And, the above-mentioned annular reinforcement 35 is arranged so as to be jointed between the rear pillar outer 46 and the rear pillar inner 47 within the closed cross sectional portion 51. In this rear pillar portion, a front portion of the above-mentioned annular reinforcement 35 is pinched and held by the jointing portion of the rear pillar 46 and 47, and a rear portion of the annular reinforcement 35 is jointed to the wheel house outer 50.

As shown in FIG. 5, a rear pillar reinforcement 52 extending rearward from the annular reinforcement 35 is provided in a rear line portion of the door-opening member 34.

Figure 13:
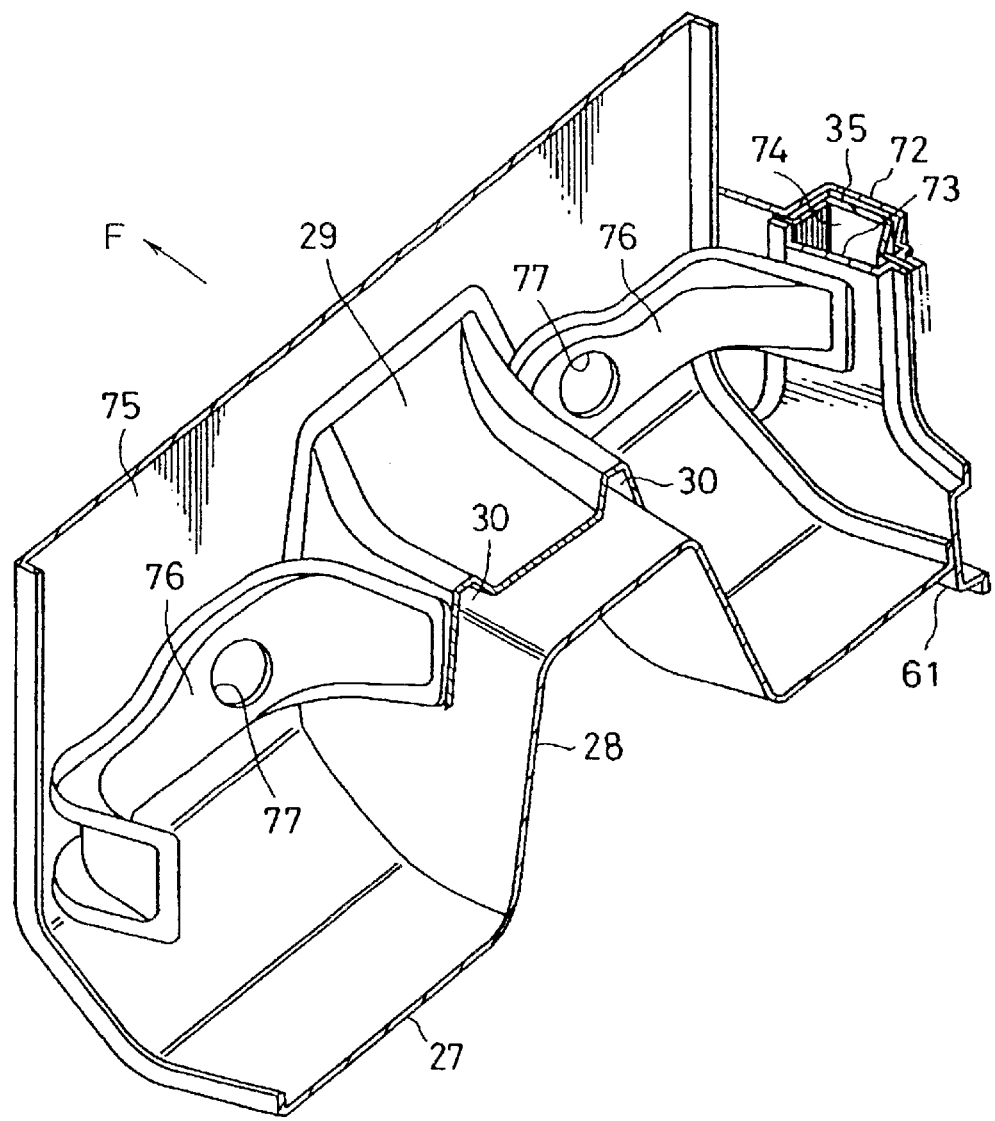
FIG. 13 is a perspective view showing a front body structure of a vehicle.

As shown in FIG. 8, the rear pillar reinforcement 52 extends rearward along a lower line portion of an opening for a rear window 53 provided in a rear portion of the vehicle, that is, a rear window opening 54. And, as shown in FIG. 13, a rear end portion 52a of the rear pillar reinforcement 52 is connected to a rear package tray upper member 55 arranged in the vehicle widthwise direction in a lower line portion of the rear window opening 54.

Figure 10:
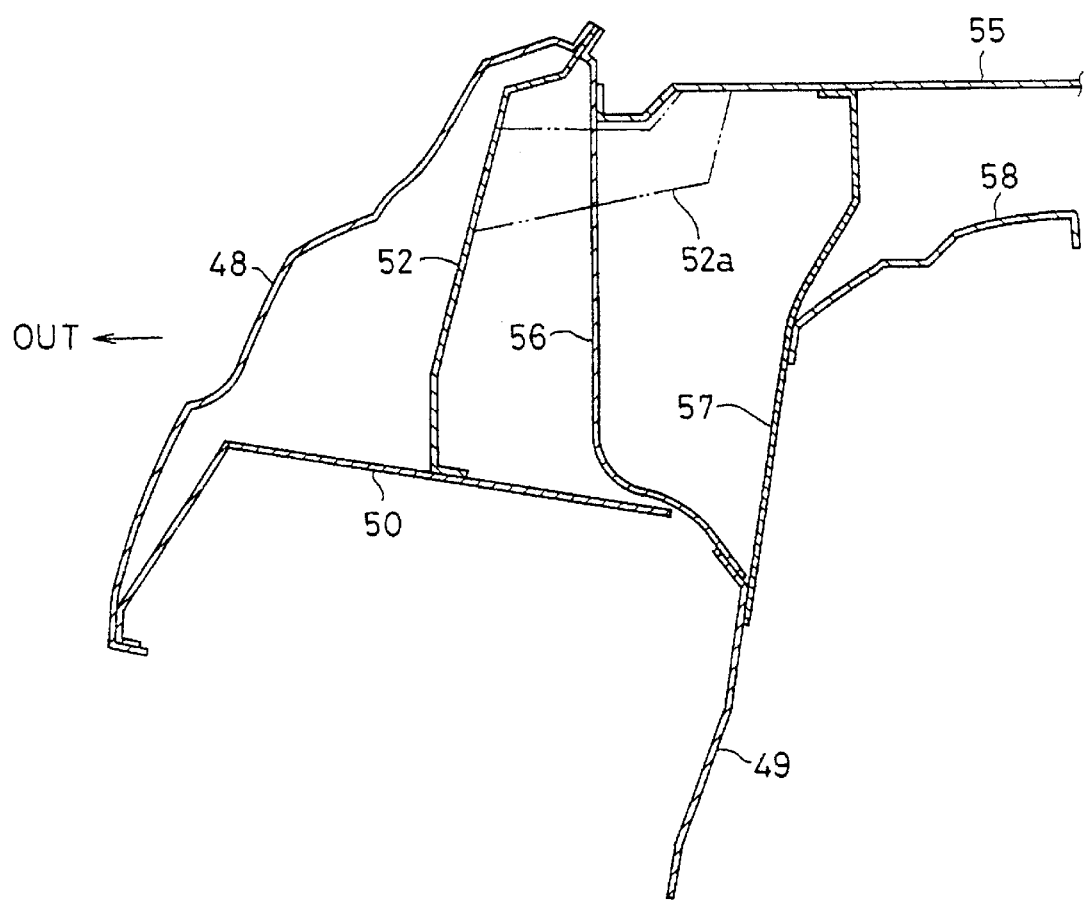
FIG. 10 is a cross sectional view as seen from a line C—C in FIG. 5.

FIG. 10 is a cross sectional view along a line C—C in FIG. 5. The above-mentioned rear pillar reinforcement 52 is mounted to the crew's cabin side (inner side) of the rear fender 48 so as to be directed substantially in a vertical direction. And a wheel house inner upper 56 is mounted to the crew's cabin side (inner side) of the rear pillar reinforcement 52. Further, the wheel house outer 50 is provided between a lower internal surface of the rear fender 48 and a lower part of the wheel house inner upper 56, and a lower end of the above-mentioned rear pillar reinforcement 52 is jointed and fixed to the wheel house outer 50.

The rear package tray upper member 55 substantially horizontally extending in the vehicle widthwise direction is laid across between upper parts of the right and left wheel house inner uppers 56. And a rear package lower gusset plate 57 is mounted between a lower surface of the rear package tray upper member 55 and the wheel house inner lower 49. Further, a reinforcing gusset plate 58 extending to the crew's cabin side (extending inward) is mounted to a middle part of the rear package lower gusset plate 57.

Figure 11:
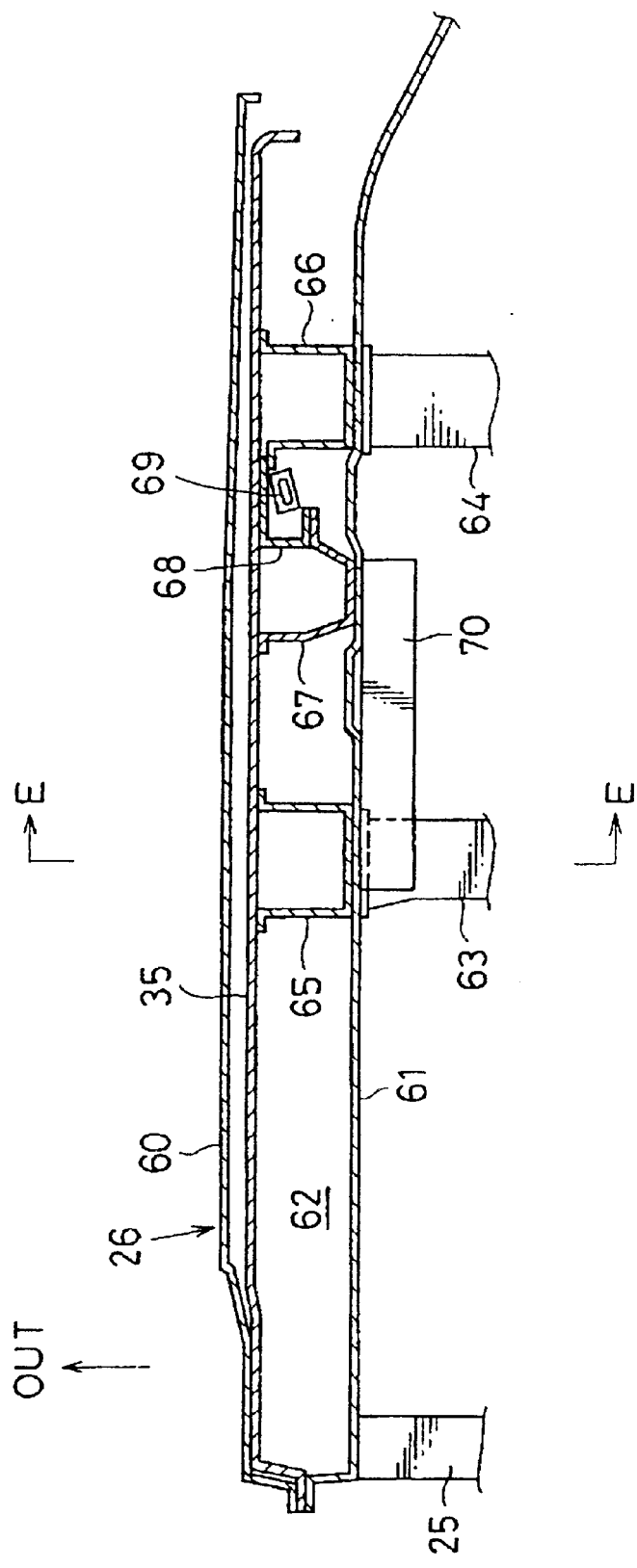
FIG. 11 is a cross sectional view of a side-sill portion corresponding to a view as seen from a line D—D in FIG. 5.
Figure 12:
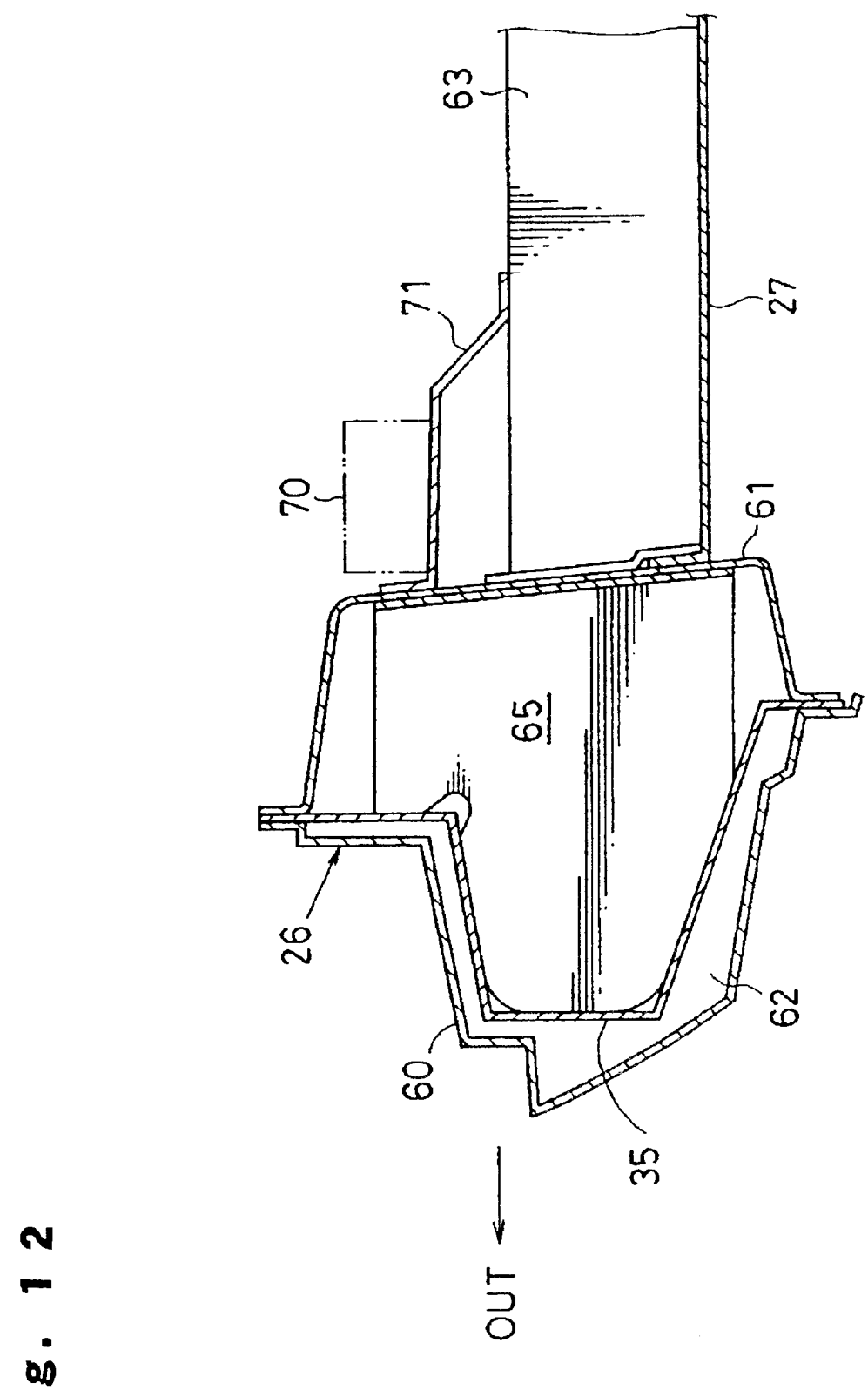
FIG. 12 is a cross sectional view as seen from a line E—E in FIG. 14.

FIG. 11 is a cross sectional view (in this case, showing a right side) corresponding to a view as seen from a line D—D in FIG. 5, and FIG. 12 is a cross sectional view as seen from a line E—E in FIG. 11. A side-sill closed cross sectional portion 62 extending in the vehicle longitudinal direction is formed by a side-sill outer 60 and a side-sill inner 61 jointed to the inner side of the side-sill outer 60. And a lower line portion of the above-mentioned annular reinforcement 35 is arranged so as to be jointed between the side-sill outer 60 and the side-sill inner 61 within the side-sill closed cross sectional portion 62.

It is to be noted that the above-mentioned side-sill 26 constituted by the side-sill outer 60 and the side-sill inner 61 is a vehicle body rigid member having a closed cross sectional structure and being arranged in the vehicle longitudinal direction in the side part of the floor panel 27. Floor cross members 63 and 64 (so-called No. 2 cross member and No. 3 cross member) extending in the vehicle widthwise direction are mounted to front and rear parts of the above-mentioned floor panel 27 to be apart from each other.

Front and rear side-sill reinforcements 65 and 66 connecting the annular reinforcement 35 to the side-sill inner 61 within the side-sill closed cross sectional portion 62 so as to form nodes are provided in such a manner as to oppose to the respective floor cross members 63 and 64. Thereby, an improvement of body rigidity against a side collision is intended.

A middle side-sill reinforcement 67 connecting the annular reinforcement 35 to the side-sill inner 61 so as to form a node is provided at a position which is a predetermined amount forward offset with respect to the rear side-sill reinforcement 66 opposing to the floor cross member 64, and which is a predetermined amount rearward offset with respect to the front side-sill reinforcement 65 opposing to the floor cross member 63. These middle and rear side-sill reinforcements 67 and 66 are connected by a bracket 68 formed in a reverse U-shape in a plan view. And a striker 69 for locking the lower part of the rear door 3 is provided between the above-mentioned side-sill reinforcements 67 and 66 and the vicinity thereof. It is to be noted that the striker 69 is structured such as to engage the latch of the lock member 17 shown in FIG. 1.

Further, a seat rail member 70 corresponding to a connection member for connecting between the floor cross member 63 and the middle side-sill reinforcement 67 is provided in the inner side of the above-mentioned side-sill inner 61.

The seat rail member 70 is structured such as to support a seat arranged on an upper surface of the floor panel 27. And a front part of the seat rail member 70 is arranged on an upper surface of a seat rail bracket 71 (refer to FIG. 12) mounted between the floor cross member 63 and the side-sill inner 61.

Figure 14:
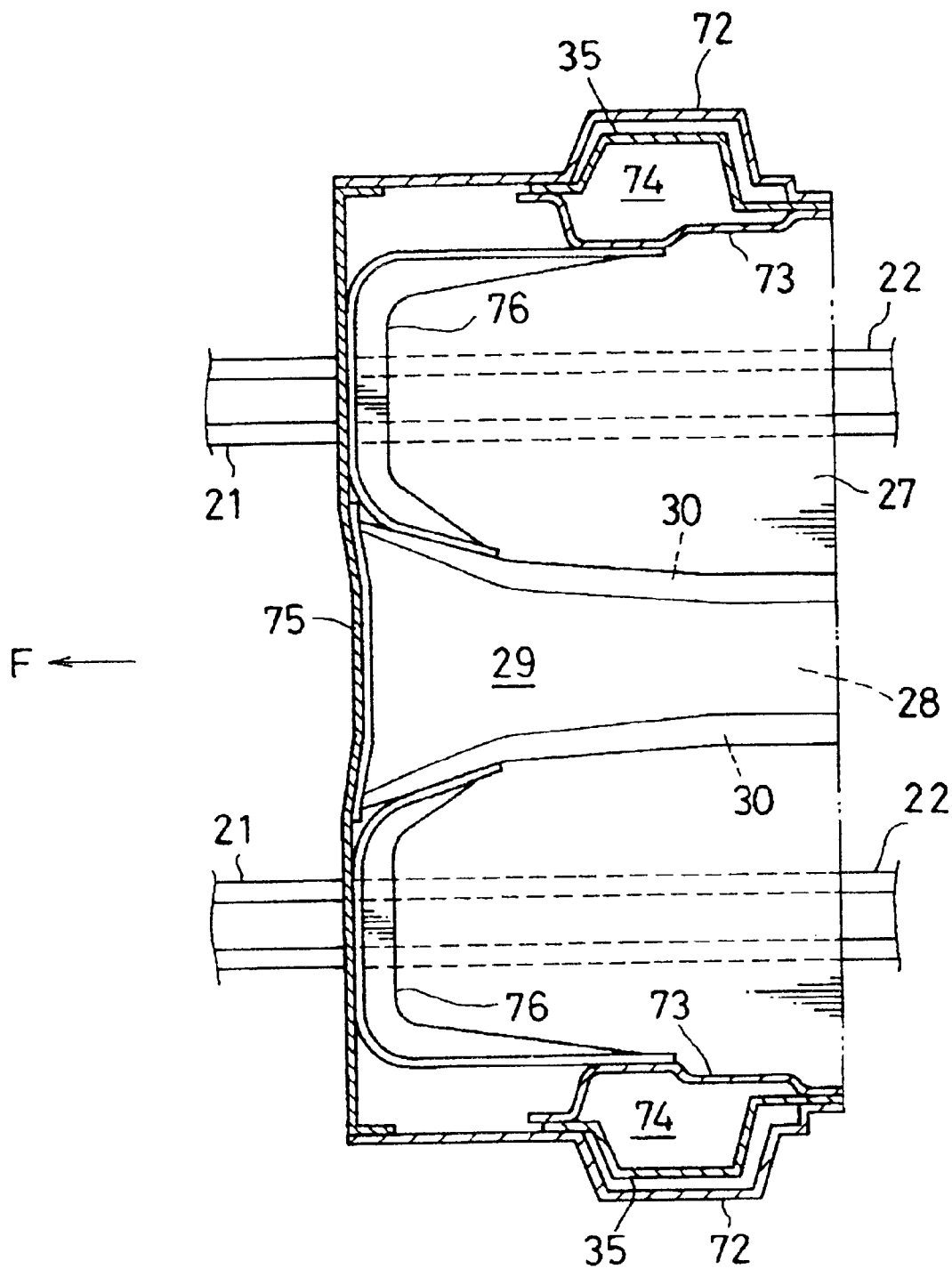
FIG. 14 is a plan view showing a major portion of FIG. 13.

FIG. 13 shows a cross sectional structure of the hinge pillar. It is to be noted that FIG. 14 corresponds to a plan view of FIG. 13. A closed cross sectional portion 74 extending in the vertical direction is formed by a hinge pillar outer 72 and a hinge pillar inner 73 connected to an inner side of the hinge pillar outer 72. And the above-mentioned annular reinforcement 35 is arranged so as to be jointed between the hinge pillar outer 72 and the hinge pillar inner 73 within the closed cross sectional portion 74.

Further, the front body structure of the vehicle is shown in FIG. 13. The front body of the vehicle is provided with the dash lower panel 75 extending in the vertical direction and constructing the front end wall of the crew's cabin, and the floor panel 27 continuously extending rearward from the dash lower panel 75. The front end portion of the above-mentioned tunnel member 29 is connected to the dash lower panel 75.

The tunnel portion 28 protruding upward and extending in the vehicle longitudinal direction is provided in the substantially center portion of the floor panel 27 as mentioned above. And a dash cross member 76 is provided on a surface in the crew's cabin side of the above-mentioned dash lower panel 75. The dash cross members 76 are arranged so as to constitute a pair of right and left pieces. And each dash cross member is structured such that one end portion in an inner side in the vehicle widthwise direction is jointed to a side surface of the tunnel portion 28 via a skirt portion of the tunnel member 29. A middle portion of the dash cross member extends in the vehicle widthwise direction along the dash lower panel 75, and another end portion in an outer side in the vehicle widthwise direction is connected to the hinge pillar inner 73.

The above-mentioned dash cross member 76 is formed substantially in a reverse U-shape in a plan view. And a pair of right and left dash cross members 76 and 76 are provided, as shown in FIG. 13, so as to extend substantially in a horizontal vehicle widthwise direction at a predetermined height position upward apart from a height of a horizontal part of the floor panel 27.

Further, an opening portion 77 for inserting and passing a steering shaft system (in particular, an intermediate shaft and a universal joint) therethrough is formed in each of the dash cross member 76 and 76 mentioned above.

Furthermore, as shown in FIG. 5, the rear end of the front side-frame 21 is connected to such a portion that corresponds to a connected portion by the above-mentioned dash cross member 76 in the outer side (engine room side) surface of the above-mentioned dash lower panel 75.

In FIG. 5, a reference numeral 78 denotes a mounting portion for the front door hinge 4 which is provided in a front line portion of the door opening 14, and a reference numeral 79 denotes a mounting portion for the rear door hinge 5 which is provided in a rear line portion of the door opening 14. The front door 2 is supported to the front line portion of the door opening 14 via the front door hinge 4 shown in FIG. 1 so as to freely open and close. The rear door 3 is supported to the rear line portion via the rear door hinge 5 shown in FIG. 1 so as to freely open and close. And the respective doors 2 and 3 having the free-style type structure are opened and closed by setting the side-sill 26 to the lower line.

It is to be noted that, in the drawings, reference symbol F denotes a vehicle forward side, and reference symbol OUT denotes a vehicle outer side.

Next, a description will be given of a side body structure of the vehicle in accordance with another embodiment of the present invention with reference to FIGS. 15 to 18. It is to be noted that the same parts in this and the previous embodiment are identified by the same reference numeral and further description thereof will be omitted.

Figure 15:
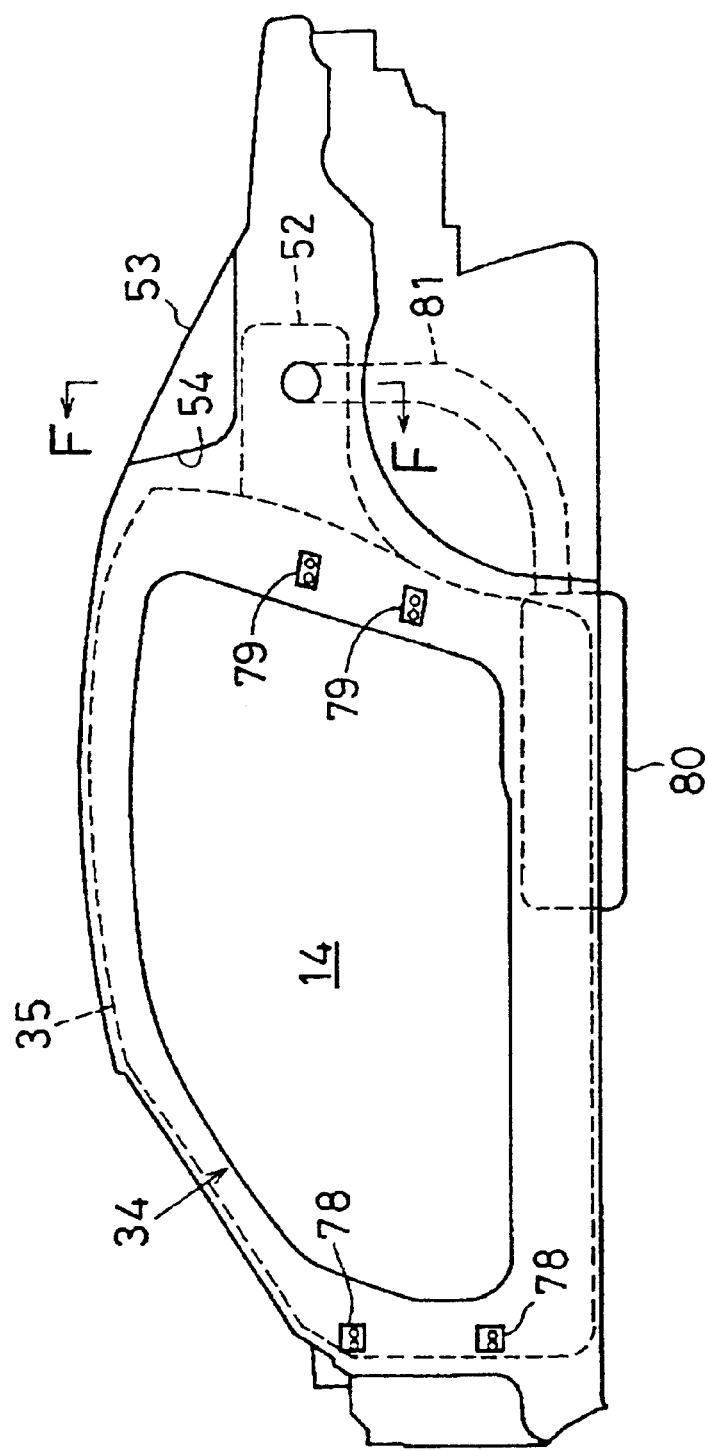
FIG. 15 is a side elevational view of a vehicle provided with a side body structure in accordance with another embodiment of the present invention.

In FIG. 15, a reference numeral 80 denotes a fuel tank. As sown in the same, an end of a filler pipe as a fuel pipe extending from the fuel tank 80 faces a side portion of the vehicle body which is close to said door-opening.

Figure 16:
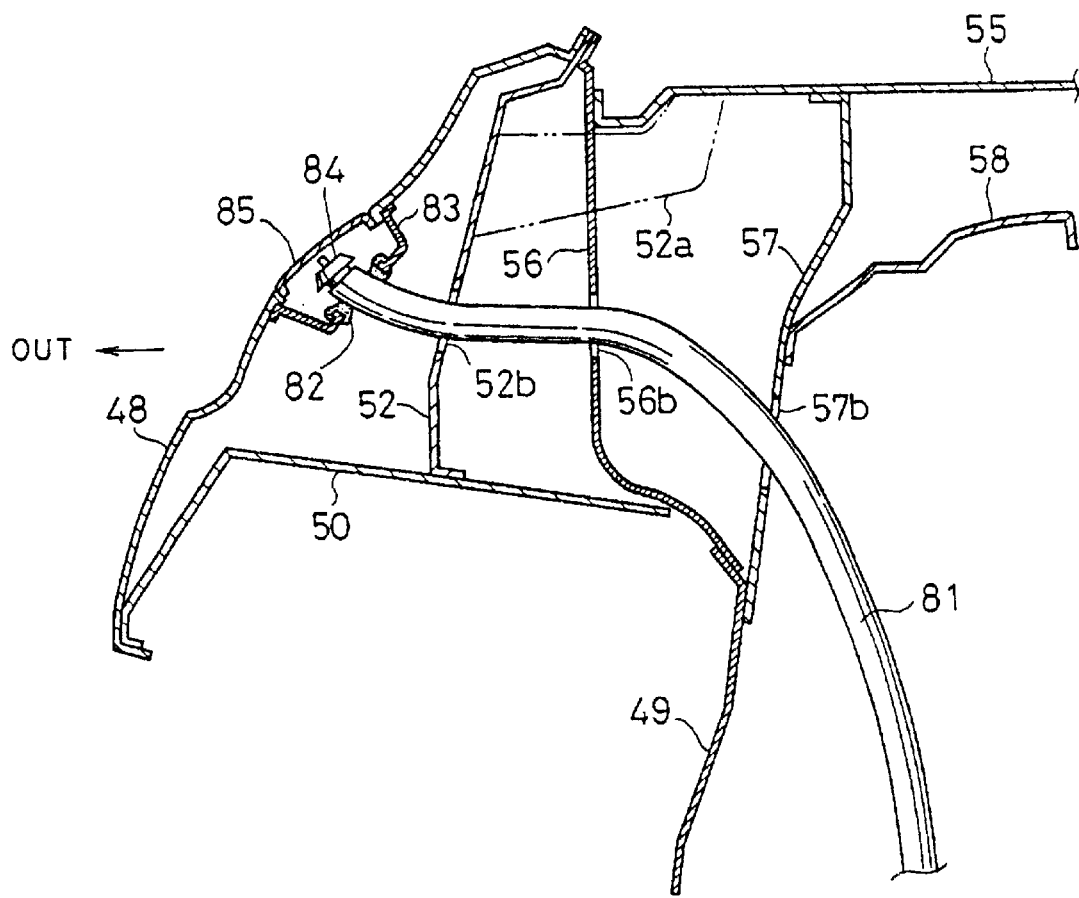
FIG. 16 is a cross sectional view as seen from a line F—F in FIG. 15.
Figure 17:
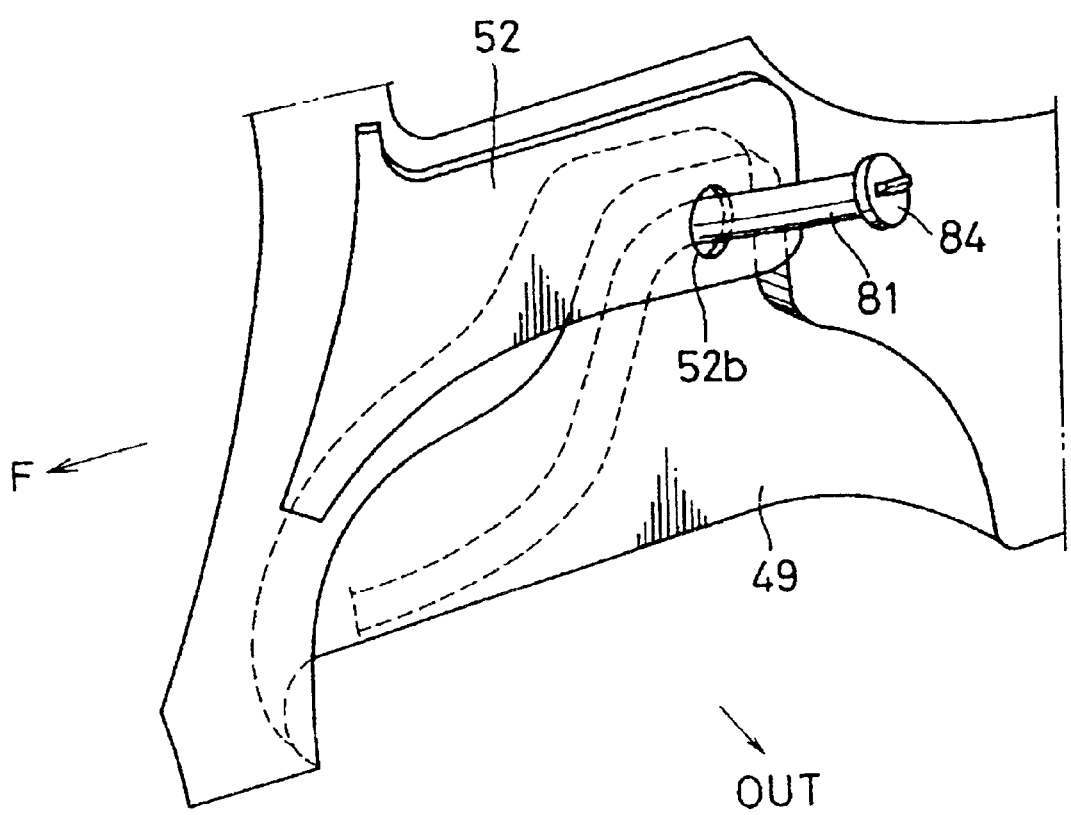
FIG. 17 is a perspective view showing an end portion of a filler pipe and a vicinity thereof.

As shown in FIGS. 15, 16 and 17, the above-mentioned rear pillar reinforcement 52 is a reinforcing member arranged so that a front end thereof is jointed to the annular reinforcement 35 and a rear end extends to proximity of the filler pipe 81. The rear pillar reinforcement 52 is provided with an extension part 52a extending along a lower line portion of the rear window 53 as described above. Further, the rear pillar reinforcement 52 is provided with a through hole 52b into which the filler pipe 81 goes through.

Furthermore, the wheel house inner upper 56 and rear package lower gusset 57 are also provided with through holes 56b and 57b into which the filler pipe 81 goes through. The metal filler pipe extending from the fuel tank 80 (refer to FIG. 15) toward the side vehicle body goes through those holes 57b, 56b and 52b in this order, and the end portion (upper end portion) faces inside of a filler box 83 through a seal member 82.

Furthermore, a filler cap 84 is removably mounted at the end (upper end) of the above-mentioned filler pipe 81. The end side of the filler pipe 81 including the filler cap 84 is covered by a filler lid 85 capable of opening and closing.

Figure 18:
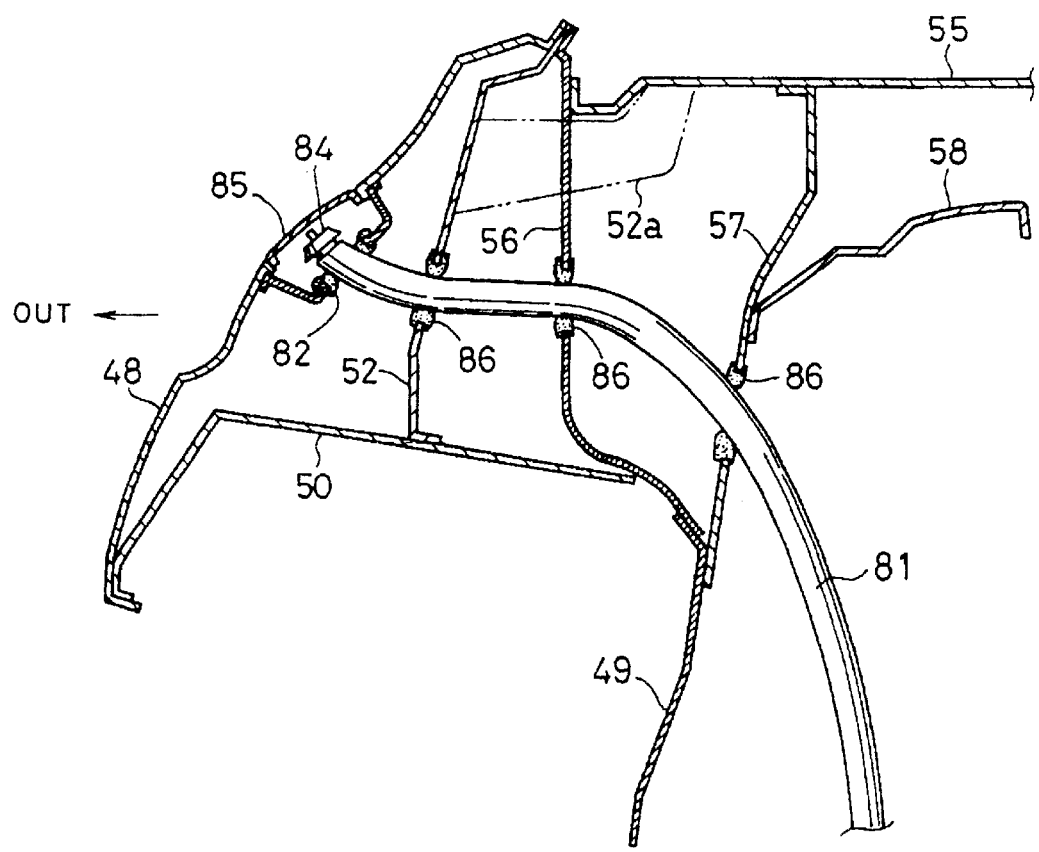
FIG. 18 is a cross sectional view showing another embodiment of a supporting structure for the filler pipe.

The filler pipe 81 between the filler cap 84 and the fuel tank 80 may go through the through holes 52b, 56b and 57b without seal member as shown in FIG. 9. Further, it may go through the through holes 52b, 56b and 57b with elastic seal members as shown in FIG. 18.

The illustrated embodiments are structured in the manner mentioned above, and a description will be given of the function and advantages thereof below.

In accordance with the present embodiment, there is provided a side body structure of a vehicle having the door-opening 14 which is opened and closed by doors 2 and 3 in which an annular door-opening member 34 is provided along the door-opening 14. The annular door-opening member 34 is formed in closed cross sectional shape by a side outer panel (refer to the roof side rail outer 36, the side-sill outer 60, the rear pillar outer 46 and the hinge pillar outer 72) and a side inner panel (refer to the roof side rail inner 37, the side-sill inner 61, the rear pillar inner 47 and the hinge pillar inner 73) jointed to inside of the side outer panel. And the door-opening member 34 is provided with an annular reinforcement 35 which integrally and continuously extends in an annular manner along the door opening 14.

According to the structure mentioned above, a closed cross sectional annular door-opening member 34 is provided along the door-opening 14, and the door-opening member 34 is provided with an annular reinforcement 35 which integrally and continuously extends in an annular manner along the door-opening 14. By employing this construction, it is possible to enhance the body rigidity of the vehicle regardless of the size of the door-opening 14. Specifically, it is possible to restrain the movement of the side body and the doors 2, 3 toward the inside of the crew's cabin, in a center pillar less type of vehicle, when the vehicle is subject to a side collision. Further, since the tortional rigidity of the vehicle body is enhanced by the annular reinforcement 35, it is possible to enhance the operating stability of the vehicle.

In the present embodiment, the above-mentioned annular reinforcement 34 is jointed between the side outer panel (refer to the roof side rail outer 36, the side-sill outer 60, the rear pillar outer 46 and the hinge pillar outer 72) and the side inner panel (refer to the roof side rail inner 37, the side-sill inner 61, the rear pillar inner 47 and the hinge pillar inner 73), and is disposed in a closed cross sectional portion 38, 51, 62 and 74 of the door-opening member 34.

According to the structure mentioned above, since the annular reinforcement 35 is disposed in a closed cross sectional portion 38, 51, 62 and 74 of the door-opening member 34, the strength of the door-opening member 34 is enhanced, thereby, it is possible to further enhance the body rigidity and the tortional rigidity of the vehicle body.

Further, in the present embodiment, a rear pillar reinforcement 52 extends rearward along a lower line portion of an rear window opening 54 provided in a rear portion of the vehicle is provided in a rear line portion of the door-opening member 34.

The lower line portion of the rear window opening 54 is set relatively slender due to design requirement of the vehicle, although it has to bear load input from a rear suspension. However, by employing the construction mentioned above, it is possible to sufficiently reinforce the lower line portion of the rear window opening 54 by the rear pillar reinforcement 52 and enhance the strength thereof.

Furthermore, in the present embodiment, a rear end of the rear pillar reinforcement 52 is connected to a rear package member (refer to the rear package tray upper member 55) arranged in the vehicle widthwise direction in a lower line portion of the rear window opening 54.

According to the structure mentioned above, the rear end of the rear pillar reinforcement 52 is connected to a rear package member (refer to the rear package tray upper member 55). Therefore, it is possible to continuously reinforce the lower line portion of the rear window opening 54 by means of the rear package member (refer to the rear package tray upper member 55) extending in the vehicle widthwise direction and right and left rear pillar reinforcements 52. As a result, it is possible to enhance the strength of the whole vehicle body, and the strength of a corner in the front lower portion of the rear window in which stress is concentrated.

In accordance with the present embodiment, there is further provided a side body structure of a vehicle having a door-opening 14 which is opened and closed by doors 2 and 3, in which, further, a lock member (refer to the striker 44) for locking the door (refer to the rear door 3) is provided in an upper line portion of the door-opening 14. And the reinforcing members (refer to the reinforcing member 42 shown in FIG. 6, the reinforcing stay 44 shown in FIG. 8) are provided between the door-opening 14 in which the lock member (refer to the striker 44) is mounted and a roof panel 40 provided in the vicinity of the door-opening 14 so as to connect to each other.

According to the structure mentioned above, the door-opening 14 provided with the lock member (refer to the striker 44) is connected to the roof panel 40 by means of the reinforcement 42, 45, it is possible to enhance the rigidity of a locking portion for the door (refer to the rear door 3) regardless the size of the door-opening 14. Thereby, it is possible to restrain the moving amount of the side body and the door into a crew's cabin at a time of a side collision of the vehicle, preferably in a center pillar less type of vehicle.

In the present embodiment, the roof panel 40 is provided with a roof reinforcement 41 extending in the vehicle widthwise direction, and a reinforcing stay 45 is provided as the reinforcing member, an end portion of the reinforcing stay 45 is connected to the roof reinforcement 41.

According to the structure mentioned above, since the door-opening 14 provided with the lock member (refer to the striker 44) is connected to the roof reinforcement 41 by means of the reinforcing stay 45, it is possible to further enhance the rigidity of a locking portion for the door (refer to the rear door 3). It is to be noted that the door-opening member 34 is provided with the above-mentioned annular reinforcement 35 which integrally and continuously extends in an annular manner along the door-opening 14. And the mounting portion of the lock member (refer to the striker 44) is reinforced by the annular reinforcement 35 as shown FIGS. 6 and 8. Therefore, it is possible to furthermore enhance the rigidity of a locking portion for the door.

Further, in the present embodiment, a node-type reinforcement (refer to the striker reinforcement 39) is disposed in the closed cross sectional portion 38 of the door-opening member 34 so as to correspond to a mounting portion of the lock member (refer to the striker 44). It is to be noted that the door-opening member 34 is formed in a closed cross sectional structure (refer to each closed cross section 38, 51, 62 and 74).

According to the structure mentioned above, it is possible to remarkably enhance the rigidity of the mounting portion of the lock member (refer to the striker 44) by both of a closed cross sectional structure of the door-opening member 34 and the node-type reinforcement (refer to the striker reinforcement 39). Thereby, it is possible to restrain more effectively the moving amount of the side body and the doors into a crew's cabin at a time of a side collision of the vehicle, preferably in a center pillar less type of vehicle.

Furthermore, in the present embodiment, a front vertical line portion of the rear door 3 is provided with a reinforcing member (refer to the door inner reinforcement 19) extending in a vertical direction as shown in FIG. 2, and a lock unit (refer to the lock member 16) provided in the reinforcing member (refer to the door inner reinforcement 19) is engaged with the lock member (refer to the striker 44).

According to the structure mentioned above, it goes without saying that it is possible to enhance the rigidity of the rear door 3 itself by arranging the reinforcing member (refer to the door inner reinforcement 19) in the rear door 3. Also, it is possible to enhance the rigidity in mounting the lock unit and the rigidity in locking the door to the vehicle body in a closed condition of the rear door 3. Thereby, it is possible to enhance the tortional rigidity of the vehicle body, and to enhance the operating stability of the vehicle.

In accordance with the present embodiment, there is further provided a side body structure of a vehicle having a door-opening which is opened and closed by doors 2 and 3, further comprises the side-sill 26 formed in a closed cross sectional shape extending in the vehicle longitudinal direction at a side of the floor panel 27, floor cross members 63, 64 provided in the floor panel 27 and extends in the vehicle widthwise direction, a node-type reinforcement (refer to the side-sill reinforcement 67) provided within the side-sill 26, and a connection member (refer to the seat rail member 70) for connecting between the floor cross member 63 and the reinforcement (refer to the side-sill reinforcement 67).

According to the structure mentioned above, it is possible to efficiently receive a lateral collision load at a time of a side collision by means of the floor cross member 63, 64 and the floor panel 27 via the node-type reinforcement (refer to the side-sill reinforcement 67) within the side-sill 26 and the connection member (refer to the seat rail member 70). As a result, it is possible to restrain the intrusion of the side body into the crew's cabin. Especially, it is possible to restrain the moving amount of the side body and the doors into a crew's cabin at a time of a side collision of the vehicle in a center pillar less type of vehicle.

In the present embodiment, the floor cross member 63 and the reinforcement (refer to the side-sill reinforcement 67) are disposed at positions which are a predetermined amount offset in the vehicle longitudinal direction.

According to the structure mentioned above, the floor cross member 63 and the node-type side-sill reinforcement 67 disposed at positions deviated to each other in the vehicle longitudinal direction are connected mutually by the connection member (refer to the seat rail member 70). Therefore, even the both members (the floor cross member 63 and the node-type reinforcement 67) are disposed at positions which are a predetermined amount offset, it is possible to efficiently receive the lateral collision load.

Further, in the present embodiment, the floor panel 27 is provided with a seat rail member 70, as the connection member, for supporting a seat arranged above the floor panel 27.

According to the structure mentioned above, the seat rail member 70 as an existing member and a strength member is corresponding to the connection member. Therefore, it is possible to receive the lateral collision load, without increasing the body weight, by using effectively the seat rail member 70 as an existing member.

Furthermore, in the present embodiment, the doors 2 and 3 are opened and closed by setting the side-sill 26 to the lower line, and a lock member (refer to the striker 69) for locking the door (refer to the rear door 3) is provided on the side-sill 26 in a vicinity of the side-sill reinforcement 67.

According to the structure mentioned above, since there is the node-type side-sill reinforcement 67 in a vicinity of the lock member (refer to the striker 69), it is possible to reinforce the lock member (refer to the striker 69) by the node-type side-sill reinforcement 67.

Furthermore, in the present embodiment, a lower line portion of the annular side-sill reinforcement 67 is disposed between the side-sill inner 61 and the side-sill outer 60 forming the side-sill 26, and the node-type side-sill reinforcement 67 is jointed to the annular reinforcement 35.

According to the structure mentioned above, the door-opening 14 is reinforced by the annual reinforcement 35 extending along the door-opening 24. Thereby, it is possible to enhance the body rigidity and the tortional rigidity of the vehicle body, and to enhance the operating stability of the vehicle. Furthermore, the lower line portion of the annular reinforcement 35 is disposed in a closed cross sectional portion of the side-sill 26, and the node-type side-sill reinforcement 67 is jointed to the annular reinforcement 35. Therefore, it is possible to further enhance the strength of the side-sill 26.

In accordance with the present embodiment, there is further provided a side body structure of a vehicle having the door-opening 14 which is opened and dosed by doors 2 and 3 in which, further, the filler pipe 81 extending from a fuel tank 80 is arranged so that an end of the filler pipe 81 faces a side portion of the vehicle body which is close to the door-opening 14. And the rear pillar reinforcement 52 is provided so that one end thereof is jointed to the annular reinforcement 35 and an other end is extended to proximity of the filler pipe 81.

According to the structure mentioned above, it is possible to support the filler pipe 81 by the rear pillar reinforcement 52, and enhance the rigidity of the vehicle body by the annular reinforcement 35 extending along the door-opening 14. In this case, even the filler pipe 81 is mounted in the side body, the rigidity of the side body is not so lowered. As a result, it is possible to restrain the deformation of the side body portion near the filler pipe 81. Especially, it is possible to secure sufficient body rigidity in a center pillar less type of vehicle.

In the present embodiment, the rear pillar reinforcement 52 is provided with a through hole 52b into which the filler pipe 81 goes through.

According to the structure mentioned above, it is possible to support the filler pipe 81 by means of the through hole 52b. Further, it is possible to set the filler pipe 81 to an optional position under enhancing the body rigidity by the rear pillar reinforcement 52.

Further, in the present embodiment, the rear pillar reinforcement 52 is provided with the extension portion 52a extending along the lower line portion of a rear window 53 (that is, the lower line portion of a rear window opening 54) provided in the rear body of the vehicle.

The lower line portion of the rear window opening 54 is set relatively slender due to design requirement of the vehicle, although it has to bear load input from a rear suspension. However, by employing the construction mentioned above, it is possible to sufficiently reinforce the lower line portion of the rear window opening 54 by the rear pillar reinforcement 52 and the extension portion 52a thereof, and enhance the strength of the lower line portion of the rear window opening 54.

Furthermore, in the present embodiment, the extension portion 52a of the rear pillar reinforcement 52 is connected to the rear package member (refer to the rear package tray upper member 55) disposed in the vehicle widthwise direction in the lower line portion of the rear window opening 54.

According to the structure mentioned above, the extension portion 52a of the rear pillar reinforcement 52 is connected to the rear package member (refer to the rear package tray upper member 55). Therefore, it is possible to continuously reinforce the lower line portion of the rear window opening 54 by means of the rear package tray upper member 55 extending in the vehicle widthwise direction and right and left rear pillar reinforcements 52. As a result, it is possible to enhance the strength of the whole vehicle body, and the strength of a corner in the front lower portion of the rear window in which stress is concentrated.

In the above-mentioned embodiment of the present invention, the door-opening 14 may be provided with the front door 2 which is supported to be opened and closed by means of hinges 4 in the front line portion of the door-opening 14.

According to the structure mentioned above, the aforesaid advantages are obtained in the side body having such a type of front door 2. Further, since the hinge mounting portion is reinforced by the annular reinforcement 35, it is possible to enhance the rigidity in supporting the front door 2.

Further, in the present embodiment, the door-opening 14 may be provided with a rear door 3 which is supported to be opened and closed by means of hinges 5 in a rear line portion of the door-opening 14.

According to the structure mentioned above, the aforesaid advantages are obtained in the side body having such a type of rear door. Further, since the hinge mounting portion is reinforced by the annular reinforcement 35, it is possible to enhance the rigidity in supporting the rear door 3.

Furthermore, in the present embodiment, a rear end of the front door 2 is to be locked at a front end of the rear door 3. And, the front end of the rear door 3 is to be locked in at least one of an upper line portion and a lower line portion of the door-opening 14.

According to the structure mentioned above, since the doors 2 and 3 are locked at portions of high rigidity which is reinforced by the annular reinforcement 35, it is possible to enhance the rigidity in supporting the doors 2 and 3 in closed condition.

It is to be noted that the present invention is not limited only to the structure in accordance with the embodiments explained above.

What is claimed is:

1. A side body structure of a vehicle having a door-opening which is opened and closed by doors,
    wherein an annular door-opening member is provided along said door-opening, the annular door-opening member being formed in closed cross sectional shape by a side outer panel and a side inner panel jointed to inside of the side outer panel, and
    wherein said door-opening member is provided with an annular reinforcement which integrally and continuously extends in an annular manner along the door opening.

2. A side body structure of a vehicle according to claim 1, wherein said annular reinforcement is jointed between said side outer panel and said side inner panel, and is disposed in a closed cross sectional portion of said door-opening member.

3. A side body structure of a vehicle according to claim 1, wherein a rear pillar reinforcement extends rearward along a lower line portion of a rear window opening provided in a rear portion of the vehicle is provided in a rear line portion of the door-opening member.

4. A side body structure of a vehicle according to claim 3, wherein a rear end of the rear pillar reinforcement is connected to a rear package member arranged in the vehicle widthwise direction in a lower line portion of the rear window opening.

5. A side body structure of a vehicle according to claim 1, wherein said door-opening is provided with a front door which is supported to be opened and closed by means of hinges in a front line portion of said door-opening.

6. A side body structure of a vehicle according to claim 1, wherein said door-opening is provided with a rear door which is supported to be opened and closed by means of hinges in a rear line portion of said door-opening.

7. A side body structure of a vehicle according to claim 6, wherein a rear end of said front door is to be locked at a front end of said rear door, and the front end of said rear door is to be locked in at least one of an upper line portion and a lower line portion of said door-opening.

8. A side body structure of a vehicle according to claim 1,
    wherein a lock member for locking the door is provided in an upper line portion of said door-opening; and
    wherein a reinforcing member is provided between said door-opening in which said lock member is mounted and a roof panel provided in vicinity of said door-opening so as to connect to each other.

9. A side body structure of a vehicle according to claim 8, wherein said roof panel is provided with a roof reinforcement extending in the vehicle widthwise direction, and a reinforcing stay is provided as said reinforcing member, an end portion of said reinforcing stay is connected to said roof reinforcement.

10. A side body structure of a vehicle according to claim 8,
    wherein a node-type reinforcement is disposed in the closed cross sectional portion of said door-opening member so as to correspond to a mounting portion of said lock member.

11. A side body structure of a vehicle according to claim 8, wherein said door-opening is provided with a front door which is supported to be opened and closed by means of hinges in a front line portion of said door-opening.

12. A side body structure of a vehicle according to claim 8, wherein said door-opening is provided with a rear door which is supported to be opened and closed by means of hinges in a rear line portion of said door-opening.

13. A side body structure of a vehicle according to claim 12, wherein a rear end of said front door is to be locked at a front end of said rear door, and the front end of said rear door is to be locked in at least one of an upper line portion and a lower line portion of said door-opening.

14. A side body structure of a vehicle according to claim 13,
    wherein a front vertical line portion of said rear door is provided with a reinforcing member extending in a vertical direction, and a lock unit provided in said reinforcing member is engaged with said lock member.

15. A side body structure of a vehicle according to claim 1, further comprising;
    a side-sill formed in a closed cross sectional shape extending in the vehicle longitudinal direction at a side of a floor panel;
    a floor cross member provided in said floor panel and extends in the vehicle widthwise direction;
    a node-type reinforcement provided within said side-sill; and
    a connection member for connecting between said floor cross member and said reinforcement.

16. A side body structure of a vehicle according to claim 15, wherein said floor cross member and said reinforcement are disposed at positions which are a predetermined amount offset in the vehicle longitudinal direction.

17. A side body structure of a vehicle according to claim 15, wherein said floor panel is provided with a seat rail member, as said connection member, for supporting a seat arranged above the floor panel.

18. A side body structure of a vehicle according to claim 15, wherein said doors are opened and closed by setting the side-sill to the lower line, and a lock member for locking said door is provided on said side-sill in a vicinity of said reinforcement.

19. A side body structure of a vehicle according to claim 15, wherein a lower line portion of said annular reinforcement is disposed between a side-sill inner and a side-sill outer forming said side-sill, and said node-type reinforcement is jointed to said annular reinforcement.

20. A side body structure of a vehicle according to claim 15, wherein said door-opening is provided with a front door which is supported to be opened and closed by means of hinges in a front line portion of said door-opening.

21. A side body structure of a vehicle according to claim 15, wherein said door-opening is provided with a rear door which is supported to be opened and closed by means of hinges in a rear line portion of said door-opening.

22. A side body structure of a vehicle according to claim 21, wherein a rear end of said front door is to be locked at a front end of said rear door, and the front end of said rear door is to be locked in at least one of an upper line portion and a lower line portion of said door-opening.

23. A side body structure of a vehicle according to claim 22, wherein a front vertical line portion of said rear door is provided with a reinforcing member extending in a vertical direction, and a lock unit provided in said reinforcing member is engaged with said lock member.

24. A side body structure of a vehicle according to claim 1, wherein a fuel pipe extending from a fuel tank is arranged so that an end of said fuel pipe faces a side portion of the vehicle body which is close to said door-opening; and wherein a rear pillar reinforcement is provided so that one end thereof is jointed to said annular reinforcement and an other end is extended to proximity of the fuel pipe.

25. A side body structure of a vehicle according to claim 24, wherein said rear pillar reinforcement is provided with a through hole into which the fuel pipe goes through.

26. A side body structure of a vehicle according to claim 24, wherein said rear pillar reinforcement is provided with an extension portion extending along a lower line portion of a rear window provided in a rear body of the vehicle.

27. A side body structure of a vehicle according to claim 26, wherein said extension portion of said rear pillar reinforcement is connected to a rear package member disposed in the vehicle widthwise direction in the lower line portion of a rear window opening.

28. A side body structure of a vehicle according to claim 24, wherein said door-opening is provided with a front door which is supported to be opened and closed by means of hinges in a front line portion of said door-opening.

29. A side body structure of a vehicle according to claim 24, wherein said door-opening is provided with a rear door which is supported to be opened and closed by means of hinges in a rear line portion of said door-opening.

30. A side body structure of a vehicle according to claim 29, wherein a rear end of said front door is to be locked at a front end of said rear door, and the front end of said rear door is to be locked in at least one of an upper line portion and a lower line portion of said door-opening.

* * * * *

UNITED STATES PATENT AND TRADEMARK OFFICE
CERTIFICATE OF CORRECTION

PATENT NO.    : 6,619,729 B2
DATED         : September 16, 2003
INVENTOR(S)   : Takayuki Kimura et al.

It is certified that error appears in the above-identified patent and that said Letters Patent is hereby corrected as shown below:

<u>Title page,</u>
Item [30], Foreign Application Priority Data, insert -- August 21, 2001 [JP]...2001-249723 --.

Signed and Sealed this

Thirteenth Day of April, 2004

JON W. DUDAS
*Acting Director of the United States Patent and Trademark Office*